United States Patent
Watanabe

(10) Patent No.: US 12,043,816 B2
(45) Date of Patent: *Jul. 23, 2024

(54) GREASE COMPOSITION

(71) Applicant: IDEMITSU KOSAN CO., LTD., Chiyoda-ku (JP)

(72) Inventor: Go Watanabe, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/995,061

(22) PCT Filed: Mar. 16, 2021

(86) PCT No.: PCT/JP2021/010632
§ 371 (c)(1),
(2) Date: Sep. 29, 2022

(87) PCT Pub. No.: WO2021/200120
PCT Pub. Date: Oct. 7, 2021

(65) Prior Publication Data
US 2023/0128223 A1    Apr. 27, 2023

(30) Foreign Application Priority Data

Mar. 31, 2020   (JP) ................. 2020-065440

(51) Int. Cl.
*C10M 169/00* (2006.01)
*C10M 101/02* (2006.01)
(Continued)

(52) U.S. Cl.
CPC ........ *C10M 169/00* (2013.01); *C10M 101/02* (2013.01); *C10M 105/04* (2013.01);
(Continued)

(58) Field of Classification Search
CPC .............. C10M 169/00; C10M 101/02; C10M 105/04; C10M 107/02; C10M 111/04;
(Continued)

(56) References Cited

U.S. PATENT DOCUMENTS

2004/0198617 A1    10/2004  Kinoshita et al.
2010/0105585 A1*   4/2010   Carey .................. C10M 169/04
                                                       252/400.21

(Continued)

FOREIGN PATENT DOCUMENTS

CN    103987821 A    8/2014
CN    109689844 A    4/2019
(Continued)

OTHER PUBLICATIONS

International Search Report mailed on Jun. 15, 2021 in PCT/JP2021/010632 filed on Mar. 16, 2021 (3 pages).
(Continued)

*Primary Examiner* — Taiwo Oladapo
(74) *Attorney, Agent, or Firm* — Oblon, McClelland, Maier & Neustadt, L.L.P.

(57) ABSTRACT

A grease composition may contain a base oil (A) and a urea-based thickener (B). Particles containing the urea-based thickener (B) in the grease composition may satisfy requirement (I). The base oil (A) may be a mixed base oil containing a high-viscosity base oil (A1) having a kinematic viscosity at 40° C. of 250 mm$^2$/s to 550 mm$^2$/s, a low-viscosity base oil (A2) having a kinematic viscosity at 40° C. of 5.0 mm$^2$/s to 110 mm$^2$/s, and an ultra-high viscosity hydrocarbon-based synthetic oil (A3) having a number average molecular weight (Mn) of 2,500 to 4,500 and a kinematic viscosity at 40° C. of 25,000 mm$^2$/s to 50,000 mm$^2$/s. The base oil (A) may have a kinematic viscosity at 40° C. of 25 mm$^2$/s to 105 mm$^2$/s and a viscosity index of
(Continued)

120 or more. Both low-temperature characteristics and a lubricating life can be achieved.

14 Claims, 4 Drawing Sheets

(51) Int. Cl.
| | | |
|---|---|---|
| *C10M 105/04* | (2006.01) | |
| *C10M 107/02* | (2006.01) | |
| *C10M 111/04* | (2006.01) | |
| *C10M 115/08* | (2006.01) | |
| *C10M 135/18* | (2006.01) | |
| *C10M 137/08* | (2006.01) | |
| *C10M 137/10* | (2006.01) | |
| *C10M 141/10* | (2006.01) | |
| *C10N 20/02* | (2006.01) | |
| *C10N 20/04* | (2006.01) | |
| *C10N 20/06* | (2006.01) | |
| *C10N 30/06* | (2006.01) | |
| *C10N 40/04* | (2006.01) | |
| *C10N 50/10* | (2006.01) | |

(52) U.S. Cl.
CPC ......... *C10M 107/02* (2013.01); *C10M 111/04* (2013.01); *C10M 115/08* (2013.01); *C10M 135/18* (2013.01); *C10M 137/08* (2013.01); *C10M 137/105* (2013.01); *C10M 141/10* (2013.01); *C10M 2203/003* (2013.01); *C10M 2203/1085* (2013.01); *C10M 2205/003* (2013.01); *C10M 2215/1026* (2013.01); *C10M 2219/066* (2013.01); *C10M 2223/043* (2013.01); *C10M 2223/047* (2013.01); *C10N 2020/02* (2013.01); *C10N 2020/04* (2013.01); *C10N 2020/06* (2013.01); *C10N 2030/06* (2013.01); *C10N 2040/04* (2013.01); *C10N 2050/10* (2013.01)

(58) Field of Classification Search
CPC .............. C10M 115/08; C10M 135/18; C10M 137/08; C10M 137/105; C10M 141/10; C10M 2203/003; C10M 2203/1085; C10M 2205/003; C10M 2215/1026; C10M 2219/066; C10M 2223/043; C10M 2223/047; C10M 2203/1006; C10M 2203/1025; C10M 169/02; C10N 2020/02; C10N 2020/04; C10N 2020/06; C10N 2030/06; C10N 2040/04; C10N 2050/10; C10N 2020/055; Y02E 10/72

See application file for complete search history.

(56) References Cited

U.S. PATENT DOCUMENTS

| | | |
|---|---|---|
| 2018/0037842 A1 | 2/2018 | Suetsugu et al. |
| 2020/0181528 A1 | 6/2020 | Kochi et al. |

FOREIGN PATENT DOCUMENTS

| | | | | |
|---|---|---|---|---|
| CN | 110892047 A | | 3/2020 | |
| JP | 2008-115304 A | | 5/2008 | |
| JP | 2010-248422 A | | 11/2010 | |
| JP | 2010-248442 A | | 11/2010 | |
| JP | 2011-42747 A | | 3/2011 | |
| JP | 10-2014-0056920 A | | 5/2014 | |
| JP | 2015064065 A | * | 4/2015 | |
| JP | 2016-69409 A | | 5/2016 | |
| JP | 2016-204623 A | | 12/2016 | |
| JP | 2017-145284 A | | 8/2017 | |
| JP | 2018-115235 A | | 7/2018 | |
| KR | 10-2014-0056920 A | | 5/2014 | |
| WO | WO 03/006590 A1 | | 1/2003 | |
| WO | WO 2013/128748 A1 | | 9/2013 | |
| WO | WO 2016/125859 A1 | | 8/2016 | |
| WO | WO 2017/126703 A1 | | 7/2017 | |
| WO | WO 2017/146257 A1 | | 8/2017 | |
| WO | WO-2017146257 A1 | * | 8/2017 | .......... C10M 107/04 |
| WO | WO 2018/043744 A1 | | 3/2018 | |
| WO | WO 2018/203542 A1 | | 11/2018 | |
| WO | WO 2020/179589 A1 | | 9/2020 | |

OTHER PUBLICATIONS

Combined Chinese Office Action and Search Report issued Nov. 10, 2023 in Chinese Patent Application No. 202180024775.0 (with unedited computer-generated English Translation), 12 pages.

* cited by examiner

GREASE COMPOSITION

CROSS-REFERENCE TO RELATED APPLICATIONS

The present application is the national stage of international application PCT/JP2021/010632, filed on Mar. 16, 2021, and claims the benefit of the filing date of Japanese Appl. No. 2020-065440, filed on Mar. 31, 2020.

TECHNICAL FIELD

The present invention relates to a grease composition.

BACKGROUND ART

A grease composition is easy to achieve sealing as compared with lubricating oils and is able to achieve downsizing and weight reduction of a machine to be applied. Accordingly, the grease composition has hitherto been widely used for lubrication of a variety of sliding portions of automobiles, electrical machinery and appliances, industrial machinery, industrial machines, and the like.

In recent years, a grease is also used in a reduction gear or a step-up gear to be used for industrial robots or the like, a reduction gear or a step-up gear to be used for wind turbine generator systems, etc., and the like.

Since a temperature environment in which these reduction gears are used is wide from a low-temperature environment to a high-temperature environment, a grease composition that exhibits excellent performance under both a low-temperature environment and a high-temperature environment is required.

In addition, a grease composition having a long lubricating life is required from the viewpoint of continuously and stably operating a reduction gear or the like for a long period of time and reducing a frequency of maintenance for replenishing the grease composition.

For example, PTL 1 describes a grease composition that contains a base oil, a thickener, molybdenum dithiophosphate, and a calcium salt, such as calcium sulfonate, and that has a long lubricating life under a high-temperature environment.

CITATION LIST

Patent Literature

PTL 1: JP 2011-042747 A

SUMMARY OF INVENTION

Technical Problem

In order to improve low-temperature characteristics of the grease composition, it has been known to reduce a kinematic viscosity of a base oil contained in the grease composition under a low-temperature environment.

In addition, in order to extend the lubricating life of the grease composition, it has been known to increase the kinematic viscosity of the base oil contained in the grease composition from the viewpoint of maintaining lubricating properties (that is, wear resistance, fatigue life, seizure resistance, and the like) of the grease composition.

Therefore, in the grease composition, it is very difficult to achieve both the low-temperature characteristics and the lubricating life because kinematic viscosities of suitable base oils conflict with each other. In addition, in PTL 1, no study is made on both low-temperature characteristics and a lubricating life.

Therefore, an object of the present invention is to provide a grease composition capable of achieving both low-temperature characteristics and a lubricating life.

Solution to Problem

The present inventor has paid attention to, in a grease composition containing a base oil and a urea-based thickener, a particle diameter of particles containing the urea-based thickener in the grease composition. It has been found that a grease composition in which the particles are adjusted such that an arithmetic average particle diameter on an area basis as measured by a laser diffraction and scattering method falls within a specified range, and a specific base oil is used can solve the above problem, thereby leading to accomplishment of the present invention.

That is, the present invention relates to the following [1] to [14].

[1] A grease composition containing:
a base oil (A); and
a urea-based thickener (B), in which
particles containing the urea-based thickener (B) in the grease composition satisfy the following requirement (I):
Requirement (I): an arithmetic average particle diameter of the particles on an area basis as measured by a laser diffraction and scattering method is 2.0 µm or less,
the base oil (A) is a mixed base oil containing a high-viscosity base oil (A1) having a kinematic viscosity at 40° C. of 250 mm$^2$/s to 550 mm$^2$/s, a low-viscosity base oil (A2) having a kinematic viscosity at 40° C. of 5.0 mm$^2$/s to 110 mm$^2$/s, and an ultra-high viscosity hydrocarbon-based synthetic oil (A3) having a number average molecular weight (Mn) of 2,500 to 4,500 and a kinematic viscosity at 40° C. of 25,000 mm$^2$/s to 50,000 mm$^2$/s,
the base oil (A) has a kinematic viscosity at 40° C. of 25 mm$^2$/s to 105 mm$^2$/s, and
the base oil (A) has a viscosity index of 120 or more.

[2] The grease composition according to the [1], in which the particles containing the urea-based thickener (B) in the grease composition further satisfy the following requirement (II):
Requirement (II): a specific surface area of the particles as measured by the laser diffraction and scattering method is 0.5×10$^5$ cm$^2$/cm$^3$ or more.

[3] The grease composition according to the [1] or [2], in which based on a total amount of the grease composition,
a content of the high-viscosity base oil (A1) is 10% by mass to 40% by mass,
a content of the low-viscosity base oil (A2) is 40% by mass to 87% by mass, and
a content of the ultra-high viscosity hydrocarbon-based synthetic oil (A3) is 2% by mass to 10% by mass.

[4] The grease composition according to any one of the [1] to [3], in which a content ratio [(A2)/(A1)] of the low-viscosity base oil (A2) to the high-viscosity base oil (A1) is 1.0 to 8.7 in terms of a mass ratio.

[5] The grease composition according to any one of the [1] to [4], in which a content ratio [(A2)/(A3)] of the low-viscosity base oil (A2) to the ultra-high viscosity hydrocarbon-based synthetic oil (A3) is 4.0 to 43.5 in terms of a mass ratio.

[6] The grease composition according to any one of the [1] to [5], in which a content ratio [(A1)/(A3)] of the high-viscosity base oil (A1) to the ultra-high viscosity hydrocarbon-based synthetic oil (A3) is 1.0 to 20.0 in terms of a mass ratio.

[7] The grease composition according to any one of the [1] to [6], further containing: a sulfur-phosphorus-based extreme pressure agent (C).

[8] The grease composition according to the [7], in which the sulfur-phosphorus-based extreme pressure agent (C) contains a mixture of a sulfur-based extreme pressure agent (C1) containing sulfur atoms and a phosphorus-based extreme pressure agent (C2) containing phosphorus atoms.

[9] The grease composition according to any one of the [1] to [8], in which a content of the urea-based thickener (B) is 1.0% by mass to 15.0% by mass based on the total amount of the grease composition.

[10] The grease composition according to any one of the [1] to [9], in which a worked penetration at 25° C. is 355 to 430.

[11] The grease composition according to any one of the [1] to [10], in which the urea-based thickener (B) is one or more selected from diurea compounds represented by the following general formula (b1):

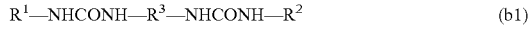

$R^1$—NHCONH—$R^3$—NHCONH—$R^2$ (b1)

wherein $R^1$ and $R^2$ each independently represent a monovalent hydrocarbon group having 6 to 24 carbon atoms, $R^1$ and $R^2$ may be the same as or different from each other, and $R^3$ represents a divalent aromatic hydrocarbon group having 6 to 18 carbon atoms.

[12] The grease composition according to any one of the [1] to [11], further containing: one or more additives (D) selected from an antioxidant, a lubricity improver, a rust inhibitor, a dispersant, and a metal deactivator.

[13] The grease composition according to any one of the [1] to [12], which is used to lubricate a lubricating site in a reduction gear or a step-up gear.

[14] A lubricating method including: lubricating a lubricating site in a reduction gear or a step-up gear with the grease composition according to any one of the [1] to [12].

Advantageous Effects of Invention

According to the present invention, it is possible to provide a grease composition capable of achieving both low-temperature characteristics and a lubricating life.

DESCRIPTION OF EMBODIMENTS

Figure 1:
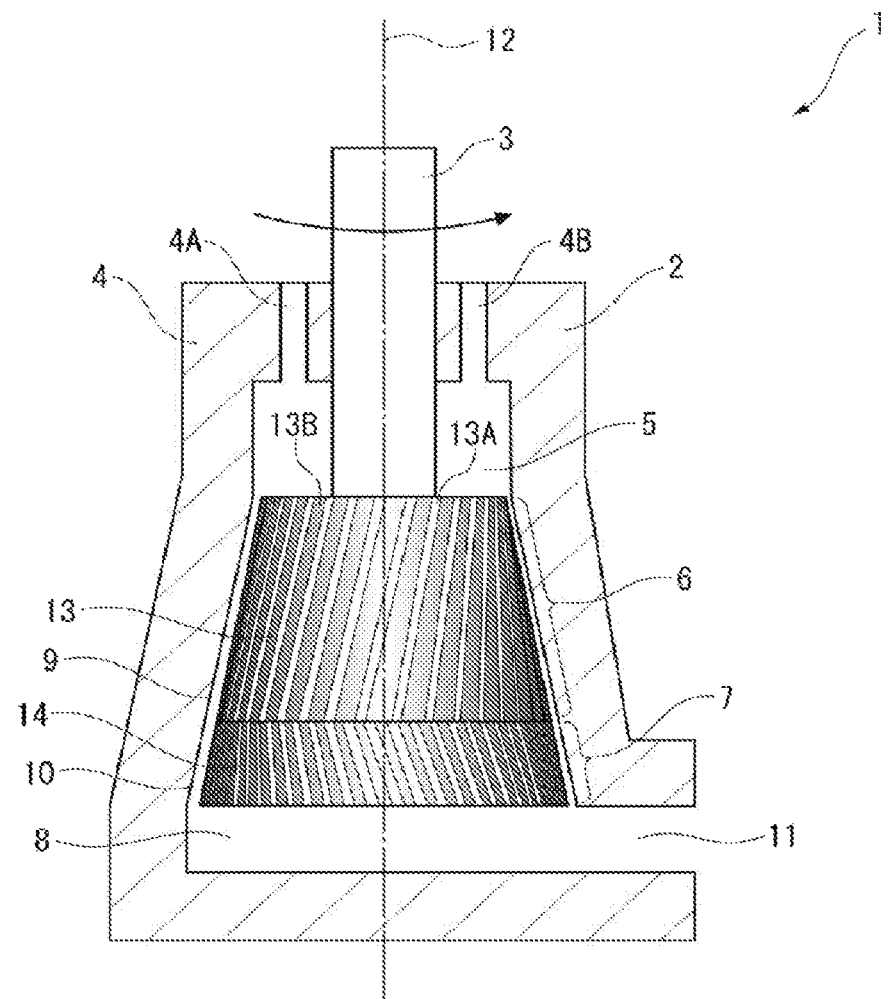
FIG. 1 is a schematic cross-sectional view of a grease production apparatus which can be used in one embodiment of the present invention.

In this description, regarding a preferred numerical value range (for example, a range of a content or the like), a lower limit value and an upper limit value that are expressed in stages can be combined each independently. For example, regarding an expression of "preferably 10 to 90, and more preferably 30 to 60", by combining the "preferred lower limit value (10)" and the "more preferred upper limit value (60)", a suitable range can also be conceived as "10 to 60".

In this description, the numerical value in Examples is a numerical value used as an upper limit value or a lower limit value.

[Grease Composition]

A grease composition according to the present invention contains a base oil (A) and a urea-based thickener (B). Particles containing the urea-based thickener (B) in the grease composition satisfy the following requirement (I). The base oil (A) is a mixed base oil containing a high-viscosity base oil (A1) having a kinematic viscosity at 40° C. of 250 mm²/s to 550 mm²/s, a low-viscosity base oil (A2) having a kinematic viscosity at 40° C. of 5.0 mm²/s to 110 mm²/s, and an ultra-high viscosity hydrocarbon-based synthetic oil (A3) having a number average molecular weight (Mn) of 2,500 to 4,500 and a kinematic viscosity at 40° C. of 25,000 mm²/s to 50,000 mm²/s. The base oil (A) has a kinematic viscosity at 40° C. of 25 mm²/s to 105 mm²/s and a viscosity index of 120 or more.

Requirement (I): an arithmetic average particle diameter of the particles on an area basis as measured by a laser diffraction and scattering method is 2.0 μm or less.

In addition, the grease composition according to one embodiment of the present invention preferably contains a sulfur-phosphorus-based extreme pressure agent (C) in addition to the base oil (A) and the urea-based thickener (B).

In the following description, the "base oil (A)", the "urea-based thickener (B)", and the "sulfur-phosphorus-based extreme pressure agent (C)" are also referred to as a "component (A)", a "component (B)", and a "component (C)", respectively.

In the grease composition according to the embodiment of the present invention, the total content of the components (A) and (B) is preferably 60% by mass or more, more preferably 70% by mass or more, still more preferably 80% by mass or more, and yet still more preferably 90% by mass or more, based on the total amount (100% by mass) of the grease composition. In addition, the total content of the components (A) and (B) is typically 100% by mass or less, preferably less than 100% by mass, more preferably 99% by mass or less, and still more preferably 98% by mass or less.

In addition, when the grease composition according to the embodiment of the present invention further contains the component (C) together with the components (A) and (B), the total content of the components (A), (B), and (C) is preferably 65% by mass or more, more preferably 75% by mass or more, still more preferably 85% by mass or more, yet still more preferably 90% by mass or more, and even still more preferably 95% by mass or more. In addition, the total content of the components (A), (B), and (C) is typically 100% by mass or less, preferably less than 100% by mass, more preferably 99% by mass or less, and still more preferably 98% by mass or less.

The grease composition according to the embodiment of the present invention may contain components other than the components (A), (B), and (C) within a range in which the effects of the present invention are not impaired.

<Requirement (I)>

In the grease composition according to the present invention, the particles containing the urea-based thickener (B) in the grease composition satisfy the following requirement (I):

Requirement (I): an arithmetic average particle diameter of the particles on an area basis as measured by a laser diffraction and scattering method is 2.0 μm or less.

When the requirement (I) is satisfied, a grease composition excellent in low-temperature characteristics is provided.

The requirement (I) can also be said to be a parameter expressing a state of aggregation of the urea-based thickener (B) in the grease composition.

Here, the term "particles containing the urea-based thickener (B)" as a measurement target by the laser diffraction and scattering method refers to particles in which the urea-based thickener (B) contained in the grease composition aggregates.

In a case in which an additive other than the urea-based thickener (B) is contained in the grease composition, the particle diameter prescribed in the requirement (I) can be obtained through measurement by the laser diffraction and scattering method for a grease composition prepared under the same conditions without being blended with the additive. However, in a case in which the additive is liquid at room temperature (25° C.), or in a case in which the additive is dissolved in the base oil (A), it does not matter if a grease composition containing the additive blended therein is the measurement target.

The urea-based thickener (B) is typically obtained by reacting an isocyanate compound with a monoamine. However, since a reaction rate is very fast, the urea-based thickener (B) aggregates, and large particles (micelle particles, so-called "lumps") are liable to be formed in excess. As a result of extensive and intensive investigations made by the present inventor, it has been found that when the particle diameter prescribed in the requirement (I) is more than 2.0 μm, in a case of increasing the worked penetration of the grease composition, low-temperature characteristics of the grease composition cannot be ensured. That is, it has been found that when the particle diameter prescribed in the requirement (I) is more than 2.0 μm, it is difficult to provide a grease composition excellent in low-temperature characteristics even when a specific base oil (A) to be described later is used.

In contrast, as a result of extensive and intensive investigations made by the present inventor, it has been found that by reducing the particle diameter prescribed in the requirement (I) to 2.0 μm or less, a grease composition excellent in low-temperature characteristics can be provided by combining with the specific base oil (A) to be described later. Moreover, it has also been found that by reducing the particle diameter prescribed in the requirement (I) to 2.0 μm or less, an effect of a specific sulfur-phosphorus-based extreme pressure agent (C) can be enhanced when the specific sulfur-phosphorus-based extreme pressure agent (C) is blended.

It is presumed that this effect is exhibited by the fact that by reducing the particle diameter prescribed in the requirement (I) to 2.0 μm or less, even at a low temperature in which a viscosity of the base oil (A) is high, the particles containing the urea-based thickener (B) are easy to come into a lubricating site (frictional surface) in a reduction gear or the like and are hardly removed from the lubricating site, whereby a holding power of the grease composition in the lubricating site is improved. In addition, by reducing the particle diameter prescribed in the requirement (I) to 2.0 μm or less, the holding power of the base oil (A) by the particles is improved. Accordingly, it is presumed that the base oil (A) is spread well in a lubricating site (frictional surface) in a reduction gear or a step-up gear, and accompanying this, an action to spread well the sulfur-phosphorus-based extreme pressure agent (C) at the lubricating site is improved, whereby an extreme pressure performance is improved.

From the viewpoint, in the grease composition according to the embodiment of the present invention, the particle diameter prescribed in the requirement (I) is preferably 1.5 μm or less, more preferably 1.0 μm or less, still more preferably 0.9 μm or less, yet still more preferably 0.8 μm or less, even still more preferably 0.7 μm or less, further more preferably 0.6 μm or less, yet further more preferably 0.5 μm or less, and even further more preferably 0.4 μm or less. In addition, the particle diameter is typically 0.01 μm or more.

<Requirement (II)>

Here, it is preferred that the grease composition according to the embodiment of the present invention further satisfies the following requirement (II):

Requirement (II): a specific surface area of the particles as measured by the laser diffraction and scattering method is $0.5 \times 10^5$ $cm^2/cm^3$ or more.

The specific surface area prescribed in the requirement (II) is a secondary index expressing a state of miniaturization of the particles containing the urea-based thickener (B) in the grease composition and the presence of large particles (lumps). That is, by satisfying the requirement (I) and further satisfying the requirement (II), it is revealed that the state of miniaturization of the particles containing the urea-based thickener (B) in the grease composition is more favorable, and the amount of the large particles (lumps) are further reduced. Therefore, it is possible to provide a grease composition which is excellent in low-temperature characteristics and in which the effect of the sulfur-phosphorus-based extreme pressure agent (C) is readily exhibited.

From the viewpoint, the specific surface area prescribed in the requirement (II) is preferably $0.7 \times 10^5$ $cm^2/cm^3$ or more, more preferably $0.8 \times 10^5$ $cm^2/cm^3$ or more, still more preferably $1.2 \times 10^5$ $cm^2/cm^3$ or more, yet still more preferably $1.5 \times 10^5$ $cm^2/cm^3$ or more, even still more preferably $1.8 \times 10^5$ $cm^2/cm^3$ or more, and further more preferably $2.0 \times 10^5$ $cm^2/cm^3$ or more. The specific surface area is typically $1.0 \times 10^6$ $cm^2/cm^3$ or less.

In this description, the values prescribed in the requirement (I) and further the requirement (II) are values measured by methods described in Examples to be described later.

In addition, the values prescribed in the requirement (I) and further the requirement (II) are able to be adjusted by chiefly adjusting production conditions of the urea-based thickener (B).

The respective components contained in the grease composition according to the present invention are hereunder described in detail while paying attention to specific means for adjusting the values prescribed in the requirement (I) and further the requirement (II).

<Base Oil (A)>

The base oil (A) contained in the grease composition according to the present invention is a mixed base oil containing the high-viscosity base oil (A1) having a kinematic viscosity at 40° C. of 250 $mm^2/s$ to 550 $mm^2/s$, the low-viscosity base oil (A2) having a kinematic viscosity at 40° C. of 5.0 $mm^2/s$ to 110 $mm^2/s$, and the ultra-high viscosity hydrocarbon-based synthetic oil (A3) having a number average molecular weight (Mn) of 2,500 to 4,500 and a kinematic viscosity at 40° C. of 25,000 $mm^2/s$ to 50,000 $mm^2/s$.

As a result of extensive and intensive investigations made by the present inventor, it has been found that by appropriately combining the high-viscosity base oil (A1), the low-viscosity base oil (A2), and the ultra-high viscosity synthetic oil (A3), a grease composition capable of improving the low-temperature characteristics of the grease composition and extending the lubricating life can be provided.

The base oil (A) needs to have a kinematic viscosity at 40° C. of 25 mm$^2$/s to 105 mm$^2$/s.

When the kinematic viscosity at 40° C. of the base oil (A) is less than 25 mm$^2$/s, the lubricating life of the grease composition is shortened. In addition, when the kinematic viscosity at 40° C. of the base oil (A) is more than 105 mm$^2$/s, a low-temperature torque (starting torque and rotational torque) is large, and the low-temperature characteristics are insufficient.

The kinematic viscosity at 40° C. of the base oil (A) according to the embodiment of the present invention is preferably 25 mm$^2$/s to 103 mm$^2$/s, more preferably 35 mm$^2$/s to 85 mm$^2$/s, and still more preferably 45 mm$^2$/s to 75 mm$^2$/s.

It is sufficient that the kinematic viscosity at 40° C. of the base oil (A) that is a mixed base oil satisfies the above range, and the kinematic viscosity at 40° C. of each base oil constituting the mixed base oil may not fall within the above range.

The base oil (A) needs to have a viscosity index of 120 or more.

The viscosity index of the base oil (A) of the present invention is preferably 125 or more, more preferably 140 or more, and still more preferably 150 or more, from the viewpoint of more readily exhibiting the effects of the present invention.

When the viscosity index of the base oil (A) is in the above range, it is possible to readily prevent a change in the kinematic viscosity of the base oil (A) due to a change in temperature, and it is possible to readily achieve both the low-temperature characteristics and the lubricating life.

A kinematic viscosity at −10° C. of the base oil (A) is preferably 500 mm$^2$/s to 3,000 mm$^2$/s, more preferably 750 mm$^2$/s to 2,500 mm$^2$/s, and still more preferably 1,000 mm$^2$/s to 2,000 mm$^2$/s, from the viewpoint of more readily exhibiting the effects of the present invention.

In addition, a kinematic viscosity at 100° C. of the base oil (A) is preferably 2 mm$^2$/s to 25 mm$^2$/s, more preferably 5 mm$^2$/s to 20 mm$^2$/s, and still more preferably 8 mm$^2$/s to 16 mm$^2$/s, from the viewpoint of more readily exhibiting the effects of the present invention.

In this description, the kinematic viscosity at −10° C. means a value calculated in conformity with JIS K2283: 2000. In addition, the kinematic viscosity at 40° C., the kinematic viscosity at 100° C., and the viscosity index mean values measured or calculated in conformity with JIS K2283:2000.

<<High-viscosity Base Oil (A1)>>

The high-viscosity base oil (A1) contributes to the improvement of wear resistance, a fatigue life, and the like of the grease composition by maintaining a high kinematic viscosity of the base oil (A).

From the viewpoint of more readily improving the wear resistance, the fatigue life, and the like of the grease composition, the kinematic viscosity at 40° C. of the high-viscosity base oil (A1) (hereinafter also referred to as a "kinematic viscosity at 40° C.") is 250 mm$^2$/s or more and 550 mm$^2$/s or less, preferably 300 mm$^2$/s or more and 500 mm$^2$/s or less, more preferably 350 mm$^2$/s or more and 450 mm$^2$/s or less, and still more preferably 380 mm$^2$/s or more and 420 mm$^2$/s or less.

As the high-viscosity base oil (A1), any base oil hitherto used as a lubricant base oil can be used without particular limitation as long as the kinematic viscosity at 40° C. satisfies 250 mm$^2$/s or more and 550 mm$^2$/s or less, and for example, one or more selected from the group consisting of a mineral oil and a synthetic oil can be used.

Examples of the mineral oil include: a atmospheric residual oil obtained by subjecting a crude oil such as a paraffinic crude oil, an intermediate base crude oil, or a naphthenic crude oil to atmospheric distillation; a distillate oil obtained by subjecting the atmospheric residual oil to vacuum distillation; and a mineral oil obtained by subjecting the distillate oil to one or more refining treatments such as solvent deasphaltation, solvent extraction, hydrocracking, solvent dewaxing, catalytic dewaxing, and hydrorefining.

The mineral oil may be used alone or may be used in combination of two or more thereof.

Here, the mineral oil is preferably a bright stock.

The bright stock refers to a high-viscosity base oil produced by subjecting a vacuum distillation residue oil of a crude oil to a treatment selected from solvent deasphaltation, solvent extraction, solvent dewaxing, hydrorefining, and the like. The crude oil for producing the bright stock is not particularly limited, and examples thereof include a paraffinic crude oil and a naphthenic crude oil.

Examples of the synthetic oil include a hydrocarbon-based oil, an aromatic oil, an ester-based oil, and an ether-based oil.

The synthetic oil may be used alone or may be used in combination of two or more thereof.

A kinematic viscosity at 100° C. of the high-viscosity base oil (A1) is preferably 1.0 mm$^2$/s to 50.0 mm$^2$/s, and more preferably 10.0 mm$^2$/s to 40.0 mm$^2$/s, from the viewpoint of more readily exhibiting the effects of the present invention.

When the kinematic viscosity at 100° C. of the high-viscosity base oil (A1) is 2 mm$^2$/s or more, the viscosity index is preferably 80 or more, and more preferably 100 or more. In addition, the viscosity index is preferably 300 or less, more preferably 250 or less, still more preferably 150 or less, and yet still more preferably 120 or less.

In the grease composition according to the embodiment of the present invention, from the viewpoint of improving the wear resistance, the fatigue life, and the like of the grease composition, a content of the high-viscosity base oil (A1) is preferably 10% by mass to 50% by mass, more preferably 10% by mass to 40% by mass, and still more preferably 10% by mass to 36% by mass, based on the total amount of the base oil (A).

In the grease composition according to the embodiment of the present invention, the content of the high-viscosity base oil (A1) is preferably 5.0% by mass to 50% by mass, more preferably 7.0% by mass to 50% by mass, still more preferably 10% by mass to 40% by mass, and yet still more preferably 10% by mass to 30% by mass, based on the total amount of the grease composition. When the content of the high-viscosity base oil (A1) is in the above range, the kinematic viscosity of the grease composition can be readily maintained high, and a grease composition excellent in wear resistance and fatigue life can be readily prepared.

The high-viscosity base oil (A1) may be used alone or may be used in combination of two or more thereof.

<<Low-Viscosity Base Oil (A2)>>

The low-viscosity base oil (A2) contributes to ensuring the low-temperature characteristics of the grease composition.

From the viewpoint of improving the low-temperature characteristics of the grease composition, the kinematic viscosity at 40° C. of the low-viscosity base oil (A2) is 5.0 mm$^2$/s to 110 mm$^2$/s, preferably 6.0 mm$^2$/s to 90.0 mm$^2$/s, more preferably 7.0 mm$^2$/s to 80.0 mm$^2$/s, still more preferably 8.0 mm$^2$/s to 75.0 mm$^2$/s, yet still more preferably 10.0 mm²/s to 50.0 mm²/s, even still more preferably 15.0 mm²/s to 40.0 mm²/s, and further more preferably 17.0 mm²/s to 30.0 mm²/s.

As the low-viscosity base oil (A2), any base oil hitherto used as a lubricant base oil can be used without particular limitation as long as the kinematic viscosity at 40° C. satisfies the above range, and for example, one or more selected from the group consisting of a mineral oil and a synthetic oil can be used.

Here, as the low-viscosity base oil (A2), for example, a base oil belonging to Group II or Group III in the American Petroleum Institute (API) base oil category is preferably used.

In addition, gas-to-liquids (GTL) base oils obtained by isomerizing a wax produced from a natural gas by a Fischer-Tropsch process or the like are also suitably used.

A kinematic viscosity at 100° C. of the low-viscosity base oil (A2) is preferably 1.0 mm²/s to 10.0 mm²/s, and more preferably 3.0 mm²/s to 5.0 mm²/s, from the viewpoint of more readily exhibiting the effects of the present invention.

When the kinematic viscosity at 100° C. is 2 mm²/s or more, the viscosity index of the low-viscosity base oil (A2) is preferably 80 or more, more preferably 90 or more, still more preferably 100 or more, yet still more preferably 110 or more, and even still more preferably 120 or more, and an upper limit value thereof is not particularly limited, and is, for example, 200.

In the grease composition according to the embodiment of the present invention, from the viewpoint of readily ensuring the low-temperature characteristics of the grease composition, a content of the low-viscosity base oil (A2) is preferably 40% by mass to 89% by mass, more preferably 60% by mass to 80% by mass, and still more preferably 65% by mass to 75% by mass, based on the total amount of the base oil (A).

In the grease composition according to the embodiment of the present invention, from the viewpoint of readily ensuring the low-temperature characteristics of the grease composition, the content of the low-viscosity base oil (A2) is preferably 40% by mass to 87% by mass, more preferably 45% by mass to 87% by mass, still more preferably 55% by mass to 80% by mass, and yet still more preferably 60% by mass to 75% by mass, based on the total amount of the grease composition.

<<Ultra-High Viscosity Hydrocarbon-Based Synthetic Oil (A3)>>

In this description, the term "ultra-high viscosity hydrocarbon-based synthetic oil" refers to a base oil having a number average molecular weight (Mn) of 2,500 to 4,500 and a kinematic viscosity at 40° C. of 25,000 mm²/s to 50,000 mm²/s.

The number average molecular weight (Mn) of the ultra-high viscosity hydrocarbon-based synthetic oil (A3) is preferably 2,800 to 4,500, more preferably 3,000 to 4,250, and still more preferably 3,500 to 4,000.

In this description, the number average molecular weight (Mn) is a value in terms of standard polystyrene measured by a gel permeation chromatography (GPC) method, and specifically means a value measured by the method described in Examples.

The kinematic viscosity at 40° C. of the ultra-high viscosity hydrocarbon-based synthetic oil (A3) is 25,000 mm²/s to 50,000 mm²/s, preferably 30,000 mm²/s to 45,000 mm²/s, and more preferably 35,000 mm²/s to 40,000 mm²/s.

Examples of the ultra-high viscosity hydrocarbon-based synthetic oil (A3) include poly-α-olefins (PAO) such as polybutene, polyisobutylene, a 1-decene oligomer, and an ethylene-propylene copolymer, and hydrides thereof.

A kinematic viscosity at 100° C. of the ultra-high viscosity hydrocarbon-based synthetic oil (A3) is preferably 1,000 mm²/s to 3,000 mm²/s, and more preferably 1,500 mm²/s to 2,500 mm²/s.

The viscosity index of the ultra-high viscosity hydrocarbon-based synthetic oil (A3) is preferably 150 or more, more preferably 200 or more, and still more preferably 250 or more.

In the grease composition according to the embodiment of the present invention, from the viewpoint of more readily exhibiting the effects of the present invention, a content of the ultra-high viscosity hydrocarbon-based synthetic oil (A3) is preferably 1% by mass to 12% by mass, more preferably 3% by mass to 9% by mass, and still more preferably 5% by mass to 7% by mass, based on the total amount of the base oil (A).

In the grease composition according to the embodiment of the present invention, from the viewpoint of more readily exhibiting the effects of the present invention, the content of the ultra-high viscosity hydrocarbon-based synthetic oil (A3) is preferably 2% by mass to 10% by mass, more preferably 3% by mass to 8% by mass, and still more preferably 4% by mass to 6% by mass, based on the total amount of the grease composition.

A content ratio [(A2)/(A1)] of the low-viscosity base oil (A2) to the high-viscosity base oil (A1) is preferably 1.0 to 8.7, more preferably 1.5 to 6.5, and still more preferably 2.0 to 4.0 in terms of a mass ratio.

A content ratio [(A2)/(A3)] of the low-viscosity base oil (A2) to the ultra-high viscosity hydrocarbon-based synthetic oil (A3) is preferably 4.0 to 43.5, more preferably 5.0 to 40.0, still more preferably 7.5 to 35.0, and yet still more preferably 8.0 to 15.0 in terms of a mass ratio.

A content ratio [(A1)/(A3)] of the high-viscosity base oil (A1) to the ultra-high viscosity hydrocarbon-based synthetic oil (A3) is preferably 1.0 to 30.0, more preferably 1.0 to 20.0, still more preferably 2.0 to 20.0, yet still more preferably 3.0 to 10.0, and even still more preferably 4.0 to 5.0 in terms of a mass ratio.

In the grease composition according to the embodiment of the present invention, the total content of the high-viscosity base oil (A1), the low-viscosity base oil (A2), and the ultra-high viscosity hydrocarbon-based synthetic oil (A3) is preferably 80% by mass to 100% by mass, more preferably 90% by mass to 100% by mass, still more preferably 95% by mass to 100% by mass, and yet still more preferably 100% by mass, based on the total amount of the base oil (A).

In the grease composition according to the embodiment of the present invention, a content of the base oil (A) is preferably 50% by mass or more, more preferably 55% by mass or more, still more preferably 60% by mass or more, and yet still more preferably 65% by mass or more, and is preferably 98.5% by mass or less, more preferably 97% by mass or less, still more preferably 95% by mass or less, and yet still more preferably 93% by mass or less, based on the total amount (100% by mass) of grease composition.

<Urea-Based Thickener (B)>

It is sufficient that the urea-based thickener (B) contained in the grease composition of the present invention is a compound having a urea bond, and a diurea compound having two urea bonds is preferred, and a diurea compound represented by the following general formula (b1) is more preferred.

$$R^1\text{---NHCONH---}R^3\text{---NHCONH---}R^2 \quad (b1)$$

The urea-based thickener (B) used in the embodiment of the present invention may be one type or a mixture of two or more types.

In the general formula (b1), $R^1$ and $R^2$ each independently represent a monovalent hydrocarbon group having 6 to 24 carbon atoms, $R^1$ and $R^2$ may be the same as or different from each other, and $R^3$ represents a divalent aromatic hydrocarbon group having 6 to 18 carbon atoms.

The number of carbon atoms in the monovalent hydrocarbon group which can be selected as $R^1$ and $R^2$ in the general formula (b1) is 6 to 24, preferably 6 to 20, and more preferably 6 to 18.

Examples of the monovalent hydrocarbon group which can be selected as $R^1$ and $R^2$ include a saturated or unsaturated monovalent chain hydrocarbon group, a saturated or unsaturated monovalent alicyclic hydrocarbon group, and a monovalent aromatic hydrocarbon group.

Here, in $R^1$ and $R^2$ in the general formula (b1), when a content rate of the chain hydrocarbon group is designated as an X molar equivalent, a content rate of the alicyclic hydrocarbon group is designated as a Y molar equivalent, and a content rate of the aromatic hydrocarbon group is designated as a Z molar equivalent, it is preferred that the following requirements (a) and (b) are satisfied.

Requirement (a): a value of $\{[(X+Y)/(X+Y+Z)]\times 100\}$ is 90 or more (preferably 95 or more, more preferably 98 or more, and still more preferably 100).

Requirement (b): an X/Y ratio is 0/100 (X=0, Y=100) to 100/0 (X=100, Y=0) (preferably 10/90 to 90/10, more preferably 10/90 to 70/30, and still more preferably 10/90 to 40/60).

Since the alicyclic hydrocarbon group, the chain hydrocarbon group, and the aromatic hydrocarbon group are each a group to be selected as $R^1$ and $R^2$ in the general formula (b1), the sum total of the X, Y, and Z values is 2 molar equivalents per mol of the compound represented by the general formula (b1). In addition, the values of the requirements (a) and (b) each mean an average value relative to the total amount of the group of the compounds represented by the general formula (b1) contained in the grease composition.

By using the compound represented by the general formula (b1), which satisfies the requirements (a) and (b), it is easy to provide a grease composition excellent in low-temperature characteristics.

The X, Y, and Z values can be calculated based on a molar equivalent of each amine used as a raw material.

Examples of the saturated monovalent chain hydrocarbon group include a linear or branched alkyl group having 6 to 24 carbon atoms. Specific examples thereof include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, an octadecenyl group, a nonadecyl group, and an eicosyl group.

Examples of the unsaturated monovalent chain hydrocarbon group include a linear or branched alkenyl group having 6 to 24 carbon atoms. Specific examples thereof include a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, an octadecenyl group, a nonadecenyl group, an eicosenyl group, an oleyl group, a geranyl group, a farnesyl group, and a linoleyl group.

The saturated monovalent chain hydrocarbon group and the unsaturated monovalent chain hydrocarbon group each may be a linear or a branched.

Examples of the saturated monovalent alicyclic hydrocarbon group include: a cycloalkyl group such as a cyclohexyl group, a cycloheptyl group, a cyclooctyl group, and a cyclononyl group; and a cycloalkyl group substituted with an alkyl group having 1 to 6 carbon atoms, such as a methylcyclohexyl group, a dimethylcyclohexyl group, an ethylcyclohexyl group, a diethylcyclohexyl group, a propylcyclohexyl group, an isopropylcyclohexyl group, a 1-methyl-propylcyclohexyl group, a butylcyclohexyl group, a pentylcyclohexyl group, a pentyl-methylcyclohexyl group, and a hexylcyclohexyl group (preferably a cyclohexyl group substituted with an alkyl group having 1 to 6 carbon atoms).

Examples of the unsaturated monovalent alicyclic hydrocarbon group include: a cycloalkenyl group such as a cyclohexenyl group, a cycloheptenyl group, and a cyclooctenyl group; and a cycloalkenyl group substituted with an alkyl group having 1 to 6 carbon atoms such as a methylcyclohexenyl group, a dimethylcyclohexenyl group, an ethylcyclohexenyl group, a diethylcyclohexenyl group, and a propylcyclohexenyl group (preferably a cyclohexenyl group substituted with an alkyl group having 1 to 6 carbon atoms).

Examples of the monovalent aromatic hydrocarbon group include a phenyl group, a biphenyl group, a terphenyl group, a naphthyl group, a diphenylmethyl group, a diphenylethyl group, a diphenylpropyl group, a methylphenyl group, a dimethylphenyl group, an ethylphenyl group, and a propylphenyl group.

The number of carbon atoms in the divalent aromatic hydrocarbon group which can be selected as $R^3$ in the general formula (b1) is 6 to 18, preferably 6 to 15, and more preferably 6 to 13.

Examples of the divalent aromatic hydrocarbon group which can be selected as $R^3$ include a phenylene group, a diphenylmethylene group, a diphenylethylene group, a diphenylpropylene group, a methylphenylene group, a dimethylphenylene group, and an ethylphenylene group.

Of these, a phenylene group, a diphenylmethylene group, a diphenylethylene group, or a diphenylpropylene group is preferred, and a diphenylmethylene group is more preferred.

In the grease composition according to the embodiment of the present invention, a content of the component (B) is preferably 1.0% by mass to 15.0% by mass, more preferably 1.5% by mass to 13.0% by mass, still more preferably 2.0% by mass to 10.0% by mass, yet still more preferably 2.5% by mass to 8.0% by mass, and even still more preferably 2.5% by mass to 6.0% by mass, based on the total amount (100% by mass) of the grease composition.

When the content of the component (B) is 1.0% by mass or more, it is easy to adjust the worked penetration of the resulting grease composition to an appropriate range.

Meanwhile, when the content of the component (B) is 15.0% by mass or less, the resulting grease composition can be adjusted to be soft, and therefore, it is easy to make the lubricating properties favorable, and the low-temperature characteristics are readily improved.

<Method for Producing Urea-Based Thickener (B)>

The urea-based thickener (B) can be typically obtained by reacting an isocyanate compound with a monoamine. The reaction is preferably performed by a method of adding a solution ß obtained by dissolving a monoamine in the base oil (A) to a heated solution a obtained by dissolving an isocyanate compound in the base oil (A).

For example, in a case of synthesizing a compound represented by the general formula (b1), a diisocyanate having a group corresponding to the divalent aromatic hydrocarbon group represented by $R^3$ in the general formula (b1) is used as the isocyanate compound, and an amine having a group corresponding to the monovalent hydrocarbon group represented by $R^1$ and $R^2$ is used as the monoamine, whereby a desired urea-based thickener (B) can be synthesized according to the method.

In order to satisfy the requirement (I) and further the requirement (II), from the viewpoint of miniaturizing the urea-based thickener (B) in the grease composition, it is preferred to produce the grease composition containing the component (A) and the component (B) by a grease production apparatus as expressed in the following [1].

[1] A grease production apparatus including:
a container body including an introduction portion into which a grease raw material is introduced and a discharge portion for discharging the grease into the outside; and
a rotor having a rotation axis in an axial direction of an inner periphery of the container body and rotatably provided in the container body, in which
the rotor includes a first concave-convex portion in which
(i) concave and convex are alternately provided along a surface of the rotor, and the concave and the convex are inclined to the rotation axis, and
(ii) a feeding ability from the introduction portion to a direction of the discharge portion is provided.

While the grease production apparatus in the above [1] is hereunder described, the expression "preferred" prescribed below is an embodiment from the viewpoint of miniaturizing the urea-based thickener (B) in the grease composition so as to satisfy the requirement (I) and further the requirement (II), unless otherwise specifically indicated.

FIG. 1 is a schematic cross-sectional view of the grease production apparatus in the above [1] that can be used in the embodiment of the present invention.

A grease production apparatus 1 shown in FIG. 1 includes a container body 2 for introducing a grease raw material into the inside thereof, and a rotor 3 having a rotation axis 12 on a central axis line of an inner periphery of the container body 2 and rotating around the rotation axis 12 as a center axis.

The rotor 3 rotates at a high speed around the rotation axis 12 as a center axis to impart a high shearing force to the grease raw material inside the container body 2. Accordingly, a grease containing the urea-based thickener (B) is produced.

As shown in FIG. 1, the container body 2 is preferably partitioned into an introduction portion 4, a retention portion 5, a first inner peripheral surface 6, a second inner peripheral surface 7, and a discharge portion 8 in this order from an upstream side.

As shown in FIG. 1, it is preferred that the container body 2 has an inner peripheral surface forming a truncated cone shape whose inner diameter gradually increases from the introduction portion 4 toward the discharge portion 8.

The introduction portion 4 serving as one end of the container body 2 is provided with a plurality of solution introducing pipes 4A and 4B for introducing a grease raw material from the outside of the container body 2.

The retention portion 5 is disposed downstream of the introduction portion 4, and is a space for temporarily retaining the grease raw material introduced from the introduction portion 4. When the grease raw material is retained in the retention portion 5 for a long time, the grease adhered to an inner peripheral surface of the retention portion 5 forms a large lump, so that it is preferred to transport the grease raw material to the first inner peripheral surface 6 in a downstream side in the shortest possible time. More preferably, it is preferred to transport the grease raw material directly to the first inner peripheral surface 6 without passing through the retention portion 5.

The first inner peripheral surface 6 is disposed in a downstream portion adjacent to the retention portion 5, and the second inner peripheral surface 7 is disposed in a downstream portion adjacent to the first inner peripheral surface 6. As to be described later in detail, it is preferred to provide a first concave-convex portion 9 on the first inner peripheral surface 6 and to provide a second concave-convex portion 10 on the second inner peripheral surface 7, for the purpose of allowing the first inner peripheral surface 6 and the second inner peripheral surface 7 to function as a high shearing portion for imparting a high shearing force to the grease raw material or the grease.

The discharge portion 8 serving as the other end of the container body 2 is a portion for discharging the grease stirred by the first inner peripheral surface 6 and the second inner peripheral surface 7, and is provided with a discharge port 11 for discharging the grease. The discharge port 11 is formed in a direction orthogonal or approximately orthogonal to the rotation axis 12. Accordingly, the grease is discharged from the discharge port 11 to the direction orthogonal or approximately orthogonal to the rotation axis 12. However, the discharge port 11 does not necessarily have to be orthogonal to the rotation axis 12, and may be formed in a direction parallel or approximately parallel to the rotation axis 12.

The rotor 3 is provided rotatably on a center axis line of the inner peripheral surface of the container body 2, which has a truncated cone shape, as the rotation axis 12, and rotates counterclockwise when the container body 2 is viewed from an upstream portion to a downstream portion as shown in FIG. 1.

The rotor 3 has an outer peripheral surface that expands in accordance with the enlargement of the inner diameter of the truncated cone of the container body 2, and the outer peripheral surface of the rotor 3 and the truncated cone-shaped inner peripheral surface of the container body 2 are maintained at a constant interval.

The outer peripheral surface of the rotor 3 is provided with a first concave-convex portion 13 of the rotor in which concave and convex are alternately provided along a surface of the rotor 3.

The first concave-convex portion 13 of the rotor is inclined to the rotation axis 12 of the rotor 3 in a direction from the introduction portion 4 to the discharge portion 8, and has a feeding ability in the direction from the introduction portion 4 to the discharge portion 8. That is, the first concave-convex portion 13 of the rotor is inclined in a direction in which a solution is pushed toward a downstream side when the rotor 3 rotates in the direction shown in FIG. 1.

A step difference between a concave portion 13A and a convex portion 13B in the first concave-convex portion 13 of the rotor is preferably 0.3 to 30, more preferably 0.5 to 15, and still more preferably 2 to 7, when a diameter of the concave portion 13A on the outer peripheral surface of the rotor 3 is 100.

The number of convex portions 13B in the first concave-convex portion 13 of the rotor in a circumferential direction is preferably 2 to 1,000, more preferably 6 to 500, and still more preferably 12 to 200.

A ratio of a width of the convex portion 13B to a width of the concave portion 13A in the first concave-convex portion 13 of the rotor [(width of convex portion)/(width of concave portion)] in a cross section orthogonal to the rotation axis 12 of the rotor 3 is preferably 0.01 to 100, more preferably 0.1 to 10, and still more preferably 0.5 to 2.

An inclination angle of the first concave-convex portion 13 of the rotor to the rotation axis 12 is preferably 2° to 85°, more preferably 3° to 45°, and still more preferably 5° to 20°.

It is preferred that the first inner peripheral surface 6 of the container body 2 is provided with the first concave-convex portion 9 formed with a plurality of concave and convex along the inner peripheral surface thereof.

It is preferred that the concave and the convex of the first concave-convex portion 9 on a container body 2 side are inclined in a direction opposite to the first concave-convex portion 13 of the rotor.

That is, it is preferred that the plurality of concave and convex in the first concave-convex portion 9 on the container body 2 side are inclined in the direction in which the solution is pushed toward the downstream side when the rotation axis 12 of the rotor 3 rotates in the direction shown in FIG. 1. A stirring ability and a discharge ability are further enhanced by the first concave-convex portion 9 having the plurality of concave and convex provided on the first inner peripheral surface 6 of the container body 2.

A depth of the concave and the convex in the first concave-convex portion 9 on the container body 2 side is preferably 0.2 to 30, more preferably 0.5 to 15, and still more preferably 1 to 5, when the inner diameter (diameter) of the container is set to 100.

The number of the concave and the convex in the first concave-convex portion 9 on the container body 2 side is preferably 2 to 1,000, more preferably 6 to 500, and still more preferably 12 to 200.

A ratio of a width of a concave portion to a width of a convex portion between grooves in the concave and the convex in the first concave-convex portion 9 on the container body 2 side [(width of concave portion)/(width of convex portion)] is preferably 0.01 to 100, more preferably 0.1 to 10, and still more preferably 0.5 to 2 or less.

An inclination angle of the concave and the convex in the first concave-convex portion 9 on the container body 2 side to the rotation axis 12 is preferably 2° to 85°, more preferably 3° to 45°, and still more preferably 5° to 20°.

By providing the first concave-convex portion 9 on the first inner peripheral surface 6 of the container body 2, the first inner peripheral surface 6 can function as a shearing portion for imparting a high shearing force to the grease raw material or the grease, but the first concave-convex portion 9 does not necessarily have to be provided.

It is preferred that a second concave-convex portion 14 of the rotor having concave and convex alternately provided along the surface of the rotor 3 is provided on an outer peripheral surface of a downstream portion of the first concave-convex portion 13 of the rotor.

The second concave-convex portion 14 of the rotor is inclined to the rotation axis 12 of the rotor 3, and has a feeding restraining ability to push the solution back toward the upstream side from the introduction portion 4 toward the discharge portion 8.

A step difference in the second concave-convex portion 14 of the rotor is preferably 0.3 to 30, more preferably 0.5 to 15, and still more preferably 2 to 7, when a diameter of the concave portion in the outer peripheral surface of the rotor 3 is set to 100.

The number of convex portions in the second concave-convex portion 14 of the rotor in the circumferential direction is preferably 2 to 1,000, more preferably 6 to 500, and still more preferably 12 to 200.

A ratio of a width of a convex portion to a width of a concave portion in the second concave-convex portion 14 of the rotor in a cross section orthogonal to the rotation axis of the rotor 3 [(width of the convex portion)/(width of the concave portion)] is preferably 0.01 to 100, more preferably 0.1 to 10, and still more preferably 0.5 to 2.

An inclination angle of the second concave-convex portion 14 of the rotor to the rotation axis 12 is preferably 2° to 85°, more preferably 3° to 45°, and still more preferably 5° to 20°.

It is preferred that the second inner peripheral surface 7 of the container body 2 is provided with the second concave-convex portion 10 formed with a plurality of concave and convex adjacent to a downstream portion of the concave and the convex in the first concave-convex portion 9 on the container body 2 side.

It is preferred that the plurality of concave and convex are formed on the inner peripheral surface of the container body 2, and that the concave and the convex are inclined in a direction opposite to an inclination direction of the second concave-convex portion 14 of the rotor.

That is, it is preferred that the plurality of concave and convex in the second concave-convex portion 10 on the container body 2 side are inclined in a direction in which the solution is pushed back toward the upstream side when the rotation axis 12 of the rotor 3 rotates in the direction shown in FIG. 1. A stirring ability is further enhanced by the concave and the convex in the second concave-convex portion 10 provided on the second inner peripheral surface 7 of the container body 2. In addition, the second inner peripheral surface 7 of the container body can function as a shearing portion for imparting a high shearing force to the grease raw material or the grease.

A depth of the concave portion in the second concave-convex portion 10 on the container body 2 side is preferably 0.2 to 30, more preferably 0.5 to 15, and still more preferably 1 to 5, when the inner diameter (diameter) of the container body 2 is set to 100.

The number of concave portions in the second concave-convex portion 10 on the container body 2 side is preferably 2 to 1,000, more preferably 6 to 500, and still more preferably 12 to 200.

A ratio of a width of the convex portion to a width of the concave portion of the concave and the convex in the second concave-convex portion 10 on the container body 2 side in the cross section orthogonal to the rotation axis 12 of the rotor 3 [(width of convex portion)/(width of concave portion)] is preferably 0.01 to 100, more preferably 0.1 to 10, and still more preferably 0.5 to 2.

An inclination angle of the second concave-convex portion 10 on the container body 2 side to the rotation axis 12 is preferably 2° to 85°, more preferably 3° to 45°, and still more preferably 5° to 20°.

A ratio of a length of the first concave-convex portion 9 on the container body 2 side to a length of the second concave-convex portion 10 on the container body 2 side [(length of first concave-convex portion)/(length of second concave-convex portion)] is preferably 2/1 to 20/1.

Figure 2:
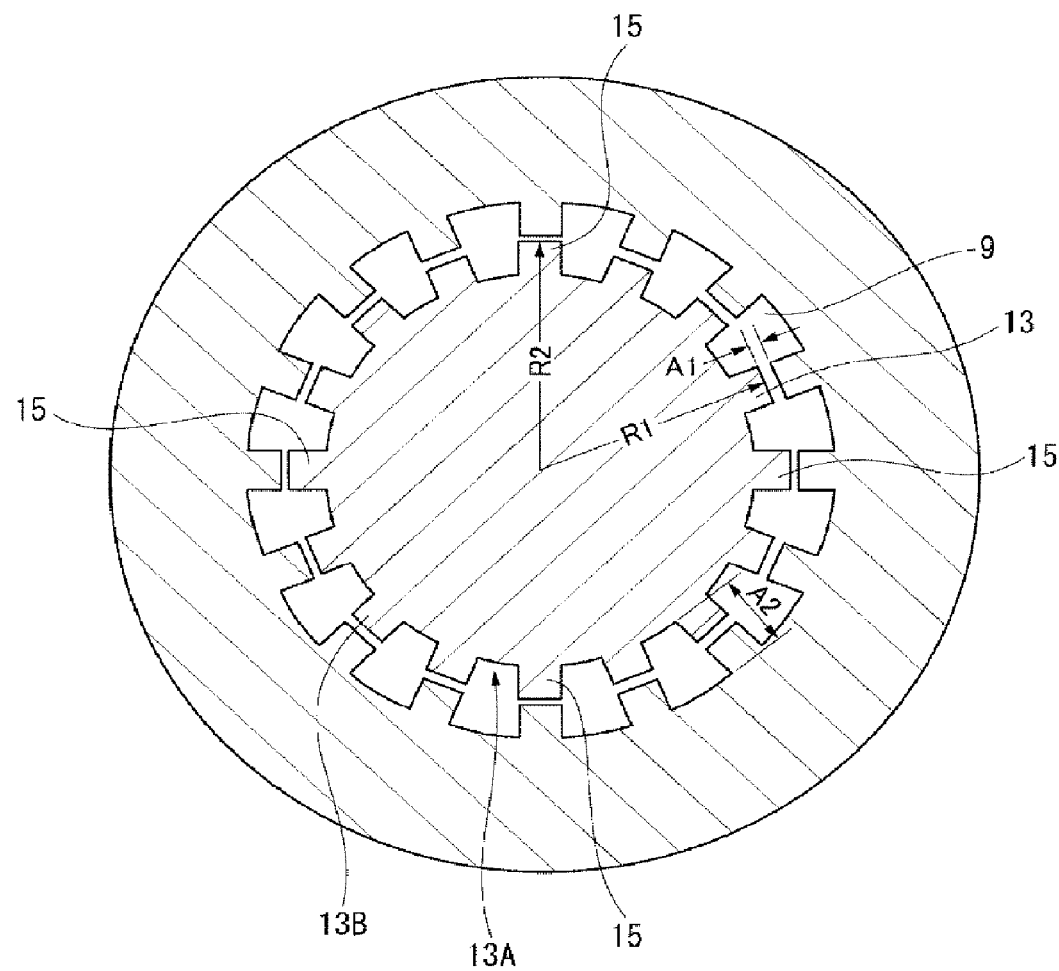
FIG. 2 is a schematic cross-sectional view in a direction orthogonal to a rotation axis in a first concave-convex portion on a container body side of the grease production apparatus in FIG. 1.

FIG. 2 is a cross-sectional view in the direction orthogonal to the rotation axis 12 in the first concave-convex portion 9 on the container body 2 side of the grease production apparatus 1.

In the first concave-convex portion 13 of the rotor shown in FIG. 2, a plurality of scrapers 15 each having a tip protruding toward an inner peripheral surface side of the container body 2 more than a tip in a protruding direction of the convex portion 13B in the first concave-convex portion 13 are provided. In addition, though not shown, the second concave-convex portion 14 is also provided with a plurality of scrapers in which a tip of the convex portion protrudes toward the inner peripheral surface side of the container body 2, similar to the first concave-convex portion 13.

The scraper 15 scrapes off the grease adhered to the inner peripheral surface of the first concave-convex portion 9 on the container body 2 side and the grease adhered to the second concave-convex portion 10 on the container body 2 side.

With respect to a protrusion amount of the tip of the scraper 15 relative to a protrusion amount of the convex portion 13B in the first concave-convex portion 13 of the rotor, a ratio [R2/R1] of a radius (R2) of the tip of the scraper 15 to a radius (R1) of the tip of the convex portion 13B is preferably more than 1.005 and less than 2.0.

The number of scrapers 15 is preferably 2 to 500, more preferably 2 to 50, and still more preferably 2 to 10.

The scraper 15 is provided in the grease production apparatus 1 shown in FIG. 2, but may not be provided, or may be provided intermittently.

In order to produce the grease containing the urea-based thickener (B) by the grease production apparatus 1, the solution α and the solution ß, which are grease raw materials, are introduced respectively from the solution introducing pipes 4A and 4B in the introduction portion 4 of the container body 2, and the rotor 3 is rotated at a high speed, whereby a grease base material containing the urea-based thickener (B) can be produced.

Even by blending the sulfur-phosphorus-based extreme pressure agent (C) and other additives (D) with the thus obtained grease base material, the urea-based thickener (B) in the grease composition can be miniaturized so as to satisfy the requirement (I) and further the requirement (II).

As a high-speed rotation condition of the rotor 3, a shear rate imparted to the grease raw material is preferably $10^2$ $s^{-1}$ or more, more preferably $10^3$ $s^{-1}$ or more, and still more preferably $10^4$ $s^{-1}$ or more, and the shear rate is typically $10^7$ $s^{-1}$ or less.

A ratio of a maximum shear rate (Max) to a minimum shear rate (Min) in the shearing at high-speed rotation of the rotor 3 (Max/Min) is preferably 100 or less, more preferably 50 or less, and still more preferably 10 or less.

When the shear rate relative to a mixed solution is made as uniform as possible, the urea-based thickener (B) or a precursor thereof in the grease composition is readily miniaturized, and a more uniform grease structure is provided.

Here, the maximum shear rate (Max) is the highest shear rate imparted to the mixed solution, and the minimum shear rate (Min) is the lowest shear rate applied to the mixed solution, which are defined as follows.

Maximum shear rate (Max)=(linear velocity at tip of convex portion 13B in first concave-convex portion 13 of rotor)/(gap A1 between tip of convex portion 13B in first concave-convex portion 13 of rotor and convex portion in first concave-convex portion 9 on first inner peripheral surface 6 of container body 2)

Minimum shear rate (Min)=(linear velocity at concave portion 13A in the first concave-convex portion 13 of rotor)/(gap A2 between concave portion 13A in first concave-convex portion 13 of rotor and concave portion in first concave-convex portion 9 on first inner peripheral surface 6 of container body 2)

The gap A1 and the gap A2 are as shown in FIG. 2.

When the grease production apparatus 1 is provided with the scraper 15, the grease adhered to the inner peripheral surface of the container body 2 can be scraped off, so that the generation of the lumps during kneading can be prevented, and a grease in which the urea-based thickener (B) is miniaturized can be continuously produced in a short time.

When the scraper 15 scrapes off the grease adhered, it is possible to prevent the retained grease from being a resistance to rotation of the rotor 3, so that a rotational torque of the rotor 3 can be reduced, and a power consumption of a drive source can be reduced, thereby making it possible to continuously produce the gr ease efficiently.

Since the inner peripheral surface of the container body 2 has a truncated cone shape whose inner diameter increases from the introduction portion 4 toward the discharge portion 8, a centrifugal force has an effect of discharging the grease or the grease raw material in a downstream direction, and the rotation torque of the rotor 3 can be reduced to continuously produce the grease.

Since the first concave-convex portion 13 of the rotor is provided on the outer peripheral surface of the rotor 3, the first concave-convex portion 13 of the rotor is inclined to the rotation axis 12 of the rotor 3, the first concave-convex portion 13 has a feeding ability from the introduction portion 4 to the discharge portion 8, the second concave-convex portion 14 of the rotor is inclined to the rotation axis 12 of the rotor 3, and the second concave-convex portion 14 has a feeding suppression ability from the introduction portion 4 toward the discharge portion 8, a high shear force can be imparted to the solution, and the urea-based thickener (B) in the grease composition can be miniaturized so as to satisfy the requirement (I) and further the requirement (II) even after being blended with an additive.

Since the first concave-convex portion 9 is formed on the first inner peripheral surface 6 of the container body 2 and is inclined in the direction opposite to the first concave-convex portion 13 of the rotor, in addition to the effect of the first concave-convex portion 13 of the rotor, sufficient stirring for the grease raw material can be carried out while extruding the grease or the grease raw material in the downstream direction, and the urea-based thickener (B) in the grease composition can be miniaturized so as to satisfy the requirement (I) and further the requirement (II) even after being blended with an additive.

The second concave-convex portion 10 is provided on the second inner peripheral surface 7 of the container body 2, and the second concave-convex portion 14 of the rotor is provided on the outer peripheral surface of the rotor 3, whereby the grease raw material can be prevented from flowing out from the first inner peripheral surface 6 of the container body more than necessary. Therefore, by imparting a high shear force to the solution to highly disperse the grease raw material, the urea-based thickener (B) can be miniaturized so as to satisfy the requirement (I) and further the requirement (II) even after being blended with an additive.

<Sulfur-Phosphorus-Based Extreme Pressure Agent (C)>

The grease composition according to the embodiment of the present invention preferably further contains the sulfur-phosphorus-based extreme pressure agent (C) together with the component (A) and the component (B).

Even when the grease composition according to the present invention does not contain the sulfur-phosphorus-based extreme pressure agent (C), by appropriately controlling the base oil (A), lubricating properties (that is, wear resistance, fatigue life, seizure resistance, and the like) of the grease composition can be maintained, and the lubricating life can be extended.

When the grease composition according to the embodiment of the present invention further contains the sulfurphosphorus-based extreme pressure agent (C), the wear resistance, the fatigue life, and the seizure resistance can be further improved.

The sulfur-phosphorus-based extreme pressure agent (C) may be a mixture of a sulfur-based extreme pressure agent (C1) containing sulfur atoms and a phosphorous-based extreme pressure agent (C2) containing phosphorus atoms, or may be an extreme pressure agent (compound) (C3) containing sulfur atoms and phosphorus atoms. In addition, any one of these may be used, or a combination of these may be used, and it is preferred to use them in combination.

In this description, the sulfur-based extreme pressure agent (C1) means an extreme pressure agent containing sulfur atoms but not containing phosphorus atoms. In addition, in this description, the phosphorus-based extreme pressure agent (C2) means an extreme pressure agent containing phosphorus atoms but not containing sulfur atoms.

When the sulfur-phosphorus-based extreme pressure agent (C) is a mixture of the sulfur-based extreme pressure agent (C1) and the phosphorus-based extreme pressure agent (C2), examples of the sulfur-based extreme pressure agent (C1) include a sulfurized fat and oil, a sulfurized fatty acid, a sulfurized ester, a sulfurized olefin, a monosulfide, a polysulfide, a dihydrocarbyl polysulfide, a thiadiazole compound, an alkyl thiocarbamoyl compound, a thiocarbamate compound, a dithiocarbamate compound, a thioterpene compound, and a dialkyl thiodipropionate compound. These may be used alone or may be used in combination of two or more thereof.

Of these, from the viewpoint of improving the wear resistance, the fatigue life, and the seizure resistance, a dithiocarbamate is preferred.

When the sulfur-phosphorus-based extreme pressure agent (C) is the mixture of the sulfur-based extreme pressure agent (C1) and the phosphorous-based extreme pressure agent (C2), examples of the phosphorus-based extreme pressure agent (C2) include: a phosphoric acid ester such as an aryl phosphate, an alkyl phosphate, an alkenyl phosphate, and an alkylaryl phosphate; an acidic phosphoric acid ester such as a monoaryl acid phosphate, a diaryl acid phosphate, a monoalkyl acid phosphate, a dialkyl acid phosphate, a monoalkenyl acid phosphate, and a dialkenyl aid phosphate; a phosphorous acid ester such as an aryl hydrogen phosphite, an alkyl hydrogen phosphite, an aryl phosphite, an alkyl phosphite, an alkenyl phosphite, and an arylalkyl phosphite; an acidic phosphorous acid ester such as a monoalkyl acid phosphite, a dialkyl acid phosphite, a monoalkenyl acid phosphite, and a dialkenyl acid phosphite; and an amine salt thereof. These may be used alone or may be used in combination of two or more thereof.

Of these, from the viewpoint of improving the wear resistance, the fatigue life, and the seizure resistance, a phosphoric acid ester amine salt is preferred.

When the sulfur-phosphorus-based extreme pressure agent (C) is the extreme pressure agent (compound) (C3) containing sulfur atoms and phosphorus atoms, examples of the compound (C3) containing sulfur atoms and phosphorus atoms include a thiophosphorus acid such as triphenyl phosphorothioate, a monoalkyl thiophosphate, a dialkyl dithiophosphate, and a trialkyl trithiophosphate, and an amine salt thereof, and a zinc dialkyl dithiophosphate (Zn-DTP). These may be used alone or may be used in combination of two or more thereof.

Of these, from the viewpoint of further improving the fatigue life while ensuring the wear resistance and the seizure resistance, a thiophosphorus acid is preferred, and a triphenyl phosphorothioate is more preferred.

A content of the sulfur-phosphorus-based extreme pressure agent (C) in the grease composition according to the embodiment of the present invention is preferably 0.1% by mass to 10% by mass, more preferably 0.5% by mass to 8.0% by mass, and still more preferably 1.0% by mass to 6.0% by mass, based on the total amount (100% by mass) of the grease composition, from the viewpoint of improving the fatigue life and the seizure resistance.

<Organic Molybdenum (C')>

The grease composition used in a reduction gear or a step-up gear is generally known to be blended with an organic molybdenum (C') as an extreme pressure agent in the grease composition from the viewpoint of improving the fatigue life and the seizure resistance.

However, the organic molybdenum (C') may also have drawbacks in corrosion resistance and compatibility with a seal rubber.

In cope with this, as a result of extensive and intensive investigations made by the present inventor, it has been found that the drawbacks of the organic molybdenum (C') can be compensated for by blending the sulfur-phosphorus-based extreme pressure agent (C) as an alternative component of the organic molybdenum (C').

In addition, when the grease composition containing the organic molybdenum (C') is used in the reduction gear or the step-up gear for a long period of time, a liquid component in the grease composition may leak from the reduction gear or the step-up gear. In cope with this, as a result of extensive and intensive investigations made by the present inventor, it has been found that when the grease composition contains the sulfur-phosphorus-based extreme pressure agent (C) as an alternative component of the organic molybdenum (C'), it does not cause leakage of the liquid component when the grease composition is used in the reduction gear or the step-up gear for a long period of time.

In the grease composition according to the embodiment of the present invention, it is preferred to reduce a content of the organic molybdenum (C') from the viewpoint of further improving a torque transmitting efficiency and a leakage prevention performance.

The content of the organic molybdenum (C') is preferably less than 1.0% by mass, more preferably less than 0.1% by mass, and still more preferably less than 0.01% by mass, based on the total amount (100% by mass) of the grease composition, and is most preferably free of the organic molybdenum (C').

<Additive (D)>

The grease composition according to the embodiment of the present invention may contain the additive (D) other than the component (B) and the component (C), which is blended in general greases, within a range in which the effects of the present invention are not impaired.

Examples of the additive (D) include an antioxidant, a rust inhibitor, a dispersant, and a metal deactivator.

The additive (D) may be used alone or may be used in combination of two or more thereof.

Examples of the antioxidant include an amine-based antioxidant such as a diphenylamine-based compound and a naphthylamine-based compound, and a phenol-based antioxidant such as a monocyclic phenol-based compound and a polycyclic phenol-based compound.

Examples of the rust inhibitor include a carboxylic acid-based rust inhibitor such as an alkenyl succinic acid polyhydric alcohol ester, zinc stearate, thiadiazole and a derivative thereof, and benzotriazole and a derivative thereof.

Examples of the dispersant include an ash-free dispersant such as succinimide and a boron-based succinimide.

Examples of the metal deactivator include a benzotriazole-based compound.

In the grease composition according to the embodiment of the present invention, contents of the additive (D) are each independently typically 0.01% by mass to 20% by mass, preferably 0.01% by mass to 15% by mass, more preferably 0.01% by mass to 10% by mass, and still more preferably 0.01% by mass to 7% by mass, based on the total amount (100% by mass) of the grease composition.

<Physical Properties of Grease Composition>
(Worked Penetration)

A worked penetration at 25° C. of the grease composition according to the embodiment of the present invention is preferably 240 to 450, more preferably 260 to 450, still more preferably 300 to 450, yet still more preferably 340 to 450, even more preferably 355 to 450, further more preferably 355 to 430, and yet further more preferably 380 to 430.

In the grease composition according to the embodiment of the present invention, even when the worked penetration at 25° C. is adjusted to the range, the leakage prevention performance of the grease composition is excellent, and a grease composition excellent in torque transmitting efficiency and leakage prevention performance is provided.

In this description, the worked penetration of the grease composition means a value measured at 25° C. in conformity with JIS K2220:2013.

(Apparent Viscosity)

An apparent viscosity of the grease composition according to the embodiment of the present invention is preferably 10 to 50, more preferably 11 to 45, still more preferably 12 to 40, yet still more preferably 13 to 35, and even still more preferably 15 to 30.

In this description, the apparent viscosity of the grease composition means a value measured at −10° C. and a shear rate of 10 s$^{-1}$ in conformity with JIS K2220:2013.

(Dropping Point)

A dropping point of the grease composition according to the embodiment of the present invention is preferably 160 or more, more preferably 170 or more, still more preferably 180 or more, yet still more preferably 200 or more, and even still more preferably 210 or more. In addition, the dropping point of the grease composition according to the embodiment of the present invention is preferably 300 or less.

In this description, the dropping point of the grease composition means a value measured in conformity with JIS K2220:2013.

(Oil Separation Degree)

An oil separation degree of the grease composition according to the embodiment of the present invention is preferably 1 to 25, more preferably 1.5 to 20, still more preferably 2 to 17, yet still more preferably 2.5 to 15, and even still more preferably 3 to 10.

In this description, the oil separation degree of the grease composition means a value measured under conditions of a temperature of 100° C. and a time of 24 hours in conformity with JIS K2220:2013.

(Low-Temperature Torque)

A starting torque at a low temperature of the grease composition according to the embodiment of the present invention is preferably 20 or less, more preferably 19 or less, still more preferably 16 or less, and yet still more preferably 14 or less.

A rotational torque at a low temperature of the grease composition according to the embodiment of the present invention is preferably 6 or less, more preferably 5 or less, and still more preferably 4 or less.

In this description, a low-temperature torque of the grease composition means a starting torque (unit: N·m) and a rotational torque (unit: N·m) obtained at a temperature of −10° C. in conformity with JIS K2220:2013.

The starting torque is a torque required to output a power from a stationary state, and is preferably small. In addition, the rotational torque is a torque required to unintermittently continuously output a power, and is preferably small.

(Lubricating Life)

Regarding the grease composition according to the embodiment of the present invention, a lubricating life of the grease composition measured and calculated by a method described in Examples to be described later is preferably more than 280 hours, more preferably 300 hours or longer, still more preferably 350 hours or longer, and yet still more preferably 400 hours or longer.

(Wear State of Component after Lubricating Life Measurement)

Regarding the grease composition according to the embodiment of the present invention, as a state of a component after the lubricating life is measured and calculated by the method described in Examples to be described later, a state in which the component is not damaged is preferred, and a state in which a wear amount of the component is small is more preferred.

<Method for Producing Grease Composition>

The grease composition according to the present invention can be produced by mixing a grease (base grease) containing the base oil (A) and the urea-based thickener (B) as synthetized by the method, with one or more selected from the sulfur-phosphorus-based extreme pressure agent (C) and the additive (D) as necessary.

For example, the grease composition according to the present invention can be produced by blending one or more selected from the sulfur-phosphorus-based extreme pressure agent (C) and the additive (D) in the grease (base grease), followed by stirring, or blending one or more selected from the sulfur-phosphorus-based extreme pressure agent (C) and the additive (D) in the grease (base grease) while stirring the grease.

<Application of Grease Composition>

The grease composition according to the present invention can achieve both the low temperature characteristics and the lubricating life.

Therefore, the grease composition according to the embodiment of the present invention can be used for lubricating portions to be lubricated, such as a bearing portion, a sliding portion, a gear portion, and a joint portion, in an apparatus required to have such characteristics. More specifically, it is preferred to use the grease composition in a bearing portion of a hub unit, an electric power steering, a driving electric motor flywheel, a ball joint, a wheel bearing, a spline portion, a constant velocity joint, a clutch booster, a servo motor, a blade bearing, or a generator.

Examples of the field of the apparatus for which the grease composition according to the present invention can be suitably used include the automobile field, the office equipment field, the machine-tool field, the windmill field, the construction field, the agricultural machine field, or the industrial robot field. Examples of the portion to be lubricated in the apparatus for the automobile field, in which the grease composition according to the present invention can be suitably used, include: bearing portions in an apparatus, such as a radiator fan motor, a fan coupling, an alternator, an idler pulley, a hub unit, a water pump, a power window, a wiper, an electric power steering, a driving electric motor fly wheel, a ball joint, a wheel bearing, a spline portion, and a constant velocity joint; and bearing portions, gear portions, and sliding portions in an apparatus such as a door lock, a door hinge, and a clutch booster.

Examples of the portion to be lubricated in the apparatus for the office equipment field, in which the grease composition according to the present invention can be suitably used, include a fixing roll in an apparatus such as a printer, and bearing and gear portions in an apparatus such as a polygon motor.

Examples of the portion to be lubricated in the apparatus for the machine-tool field, in which the grease composition according to the present invention can be suitably used, include bearing portions in a reduction gear, such as a spindle, a servo motor, and a working robot.

Examples of the portion to be lubricated in the apparatus for the windmill field, in which the grease composition according to the present invention can be suitably used, include a blade bearing and bearing portions in a generator. Examples of the portion to be lubricated in the apparatus for the construction or agricultural machine field, in which the grease composition according to the present invention can be suitably used, include bearing portions, gear portions, and sliding portions, such as a ball joint and a spline portion. The grease composition according to the present invention can be suitably used for a reduction gear provided in an industrial robot and a step-up gear provided in a wind turbine generator system.

Examples of the reduction gear and the step-up gear include a reduction gear composed of a gear mechanism and a step-up gear composed of a gear mechanism. However, an application object of the grease composition according to the embodiment of the present invention is not limited to the reduction gear composed of a gear mechanism and the step-up gear composed of a gear mechanism. For example, the grease composition according to the embodiment of the present invention can also be applied to a traction drive or the like. In addition, examples of the reduction gear include an RV type, a harmonic type, and a cyclo type, any of which can be suitably used.

In addition, according to one embodiment of the present invention, there is provided an apparatus having the grease composition according to the present invention in a lubricating site, such as a bearing portion, a sliding portion, a gear portion, and a joint portion, preferably a reduction gear or a step-up gear.

Further, according to one embodiment of the present invention, there is provided a lubricating method for lubricating a lubricating site in an apparatus, such as a reduction gear and a step-up gear (for example, a bearing portion, a sliding portion, a gear portion, and a joint portion) with the grease composition according to the present invention.

EXAMPLES

The present invention is hereunder specifically described by reference to Examples, but the present invention is not limited to the following Examples.
[Various Physical Property Values]
Measurement methods for various physical property values were as follows.
(1) Kinematic Viscosity at −10° C. of Base Oil (A) (Mixed Base Oil)
The calculation was performed in conformity with JIS K2283:2000.

(2) Kinematic Viscosity at 40° C., Kinematic Viscosity at 100° C., and Viscosity Index of Base Oil (A) (Mixed Base Oil)
The measurement and calculation were performed in conformity with JIS K2283:2000.
(3) Worked Penetration (¼) of Grease Composition
The measurement was performed at 25° C. in conformity with JIS K2220:2013.
(4) Apparent Viscosity of Grease Composition
The apparent viscosity was determined at −10° C. and a shear rate of 10 s$^{-1}$ in conformity with JIS K2220:2013.
(5) Dropping Point of Grease Composition
The measurement was performed in conformity with JIS K2220:2013.
(6) Oil Separation Degree of Grease Composition
The measurement was performed under conditions of a temperature of 100° C. and a time of 24 hours in conformity with JIS K2220:2013.

First, low-temperature characteristics were evaluated for Examples 1 to 3 and Comparative Example 1 to be described later.
[Raw Materials]
In Examples 1 to 3 and Comparative Example 1, the base oil (A), the sulfur-phosphorus-based extreme pressure agent (C), and the additive (D), which were used as raw materials for preparing the grease composition, were as follows.
The base oil (A) used in Examples 1 to 3 and Comparative Example 1 was prepared by blending and mixing the following base oil (A1), base oil (A2), and base oil (A3) in amounts shown in Table 1.
<Base Oil (A)>
  High-viscosity base oil (A1) (bright stock, kinematic viscosity at 40° C.: 409 mm$^2$/s, kinematic viscosity at 100° C.: 30.9 mm$^2$/s, and viscosity index: 107)
  Low-viscosity base oil (A2): (base oil classified into group III in API classification, kinematic viscosity at 40° C.: 19 mm$^2$/s, kinematic viscosity at 100° C.: 4.2 mm$^2$/s, viscosity index: 126, paraffin content (% $C_P$): 93.3, base oil obtained by subjecting base stock containing wax to hydrogenation isomerization dewaxing treatment and then hydrogenation finishing treatment)
  Ultra-high viscosity hydrocarbon-based synthetic oil (A3): (number average molecular weight (Mn): 3,800, kinematic viscosity at 40° C.: 37,500 mm$^2$/s, kinematic viscosity at 100° C.: 2,000 mm$^2$/s, and viscosity index: 300. The number average molecular weight (Mn) was measured under the following conditions using a gel permeation chromatography apparatus (apparatus name: "1260 type HPLC", manufactured by Agilent Technologies, Inc.), and a value measured in terms of standard polystyrene was used.)
(Measurement Conditions)
  Column: two columns "Shodex LF 404" were sequentially connected.
  Column temperature: 35° C.
  Developing solvent: chloroform
  Flow velocity: 0.3 mL/min
<Sulfur-Phosphorus-Based Extreme Pressure Agent (C)>
  Sulfur-based extreme pressure agent (C1): dithiocarbamate
  Phosphorus-based extreme pressure agent (C2): phosphoric acid ester amine salt formed from tridecyl acid phosphate and tri-n-octylamine
  Extreme pressure agent (C3) containing sulfur atoms and phosphorus atoms: triphenyl phosphorothioate
<Additive (D)>
  Predetermined amounts of an antioxidant, a rust inhibitor, and a metal deactivator were used.

Example 1

(1) Synthesis of Urea Grease

A base oil (A) obtained by mixing 10.0 parts by mass of the high-viscosity base oil (A1), 30.0 parts by mass of the low-viscosity base oil (A2), and 2.5 parts by mass of the ultra-high viscosity hydrocarbon-based synthetic oil (A3) was heated to 70° C. To the heated base oil (A), 2.46 parts by mass of diphenylmethane-4,4'-diisocyanate was added to prepare a solution α.

In addition, to a separately prepared base oil (A) obtained by mixing 10.0 parts by mass of the high-viscosity base oil (A1), 30.0 parts by mass of the low-viscosity base oil (A2), and 2.5 parts by mass of the ultra-high viscosity hydrocarbon-based synthetic oil (A3) and heating the mixture to 70° C., 1.03 parts by mass of octadecylamine and 1.52 parts by mass of cyclohexylamine were added to prepare a solution ß.

Then, using the grease production apparatus 1 shown in FIG. 1, the solution α heated to 70° C. was introduced at a flow rate of 150 L/h from the solution introducing pipe 4A into the container body 2, and the solution ß heated to 70° C. was simultaneously introduced at a flow rate of 150 L/h from the solution introducing pipe 4B into the container body 2, and the solution α and the solution ß were unintermittently continuously introduced into the container body 2 in a state where the rotor 3 was rotated, thereby synthesizing a urea grease (b1).

The rotation speed of the rotor 3 of the grease production apparatus 1 used was 8,000 rpm. In addition, on this occasion, a maximum shear rate (Max) was 10,500 s$^{-1}$, and stirring was performed while setting a ratio of the maximum shear rate (Max) to the minimum shear rate (Min) [Max/Min] to 3.5.

The urea-based thickener (B1) contained in the urea grease (b1) corresponds to a compound represented by the general formula (b1) in which $R^1$ and $R^2$ are selected from a cyclohexyl group and an octadecyl group and $R^3$ is a diphenylmethylene group.

In addition, a molar ratio of octadecylamine to cyclohexylamine used as the raw materials (octadecylamine/cyclohexylamine) is 20/80.

(2) Preparation of Grease Composition

In the above (1), the urea grease (b1) discharged from the grease production apparatus 1 shown in FIG. 1 was stirred and then cooled by natural cooling, and were then added with the sulfur-based extreme pressure agent (C1), the phosphorus-based extreme pressure agent (C2), the extreme pressure agent (C3) containing sulfur atoms and phosphorus atoms, and the additive (D) in blending amounts shown in Table 1, to obtain a grease composition in Example 1.

Examples 2 and 3

Grease compositions in Examples 2 and 3 were obtained by the same method as that of the grease composition in Example 1, except that urea-based thickeners (B2) and (B3) were used in which the blending of the base oil (A) was changed to the blending shown in Table 1 and production conditions of the urea grease were further adjusted to adjust the arithmetic average particle diameter and the specific surface area of particles containing the urea-based thickener (B) to be described later to values shown in Table 1.

The urea-based thickeners (B2) and (B3) correspond to a compound represented by the general formula (b1) in which $R^1$ and $R^2$ are selected from a cyclohexyl group and an octadecyl group and $R^3$ is a diphenylmethylene group.

In addition, a molar ratio of octadecylamine and cyclohexylamine used as the raw materials (octadecylamine/cyclohexylamine) is 20/80.

Comparative Example 1

(1) Synthesis of Urea Grease

To a base oil (A) obtained by mixing 10.0 parts by mass of the high-viscosity base oil (A1), 30.0 parts by mass of the low-viscosity base oil (A2), and 2.5 parts by mass of the ultra-high viscosity hydrocarbon-based synthetic oil (A3), 2.46 parts by mass of diphenylmethane-4,4'-diisocyanate was added to prepare a solution α.

In addition, to a separately prepared base oil (A) obtained by mixing 10.0 parts by mass of the high-viscosity base oil (A1), 30.0 parts by mass of the low-viscosity base oil (A2), and 2.5 parts by mass of the ultra-high viscosity hydrocarbon-based synthetic oil (A3), 1.03 parts by mass of octadecylamine and 1.52 parts by mass of cyclohexylamine were added to prepare a solution ß.

Figure 3:
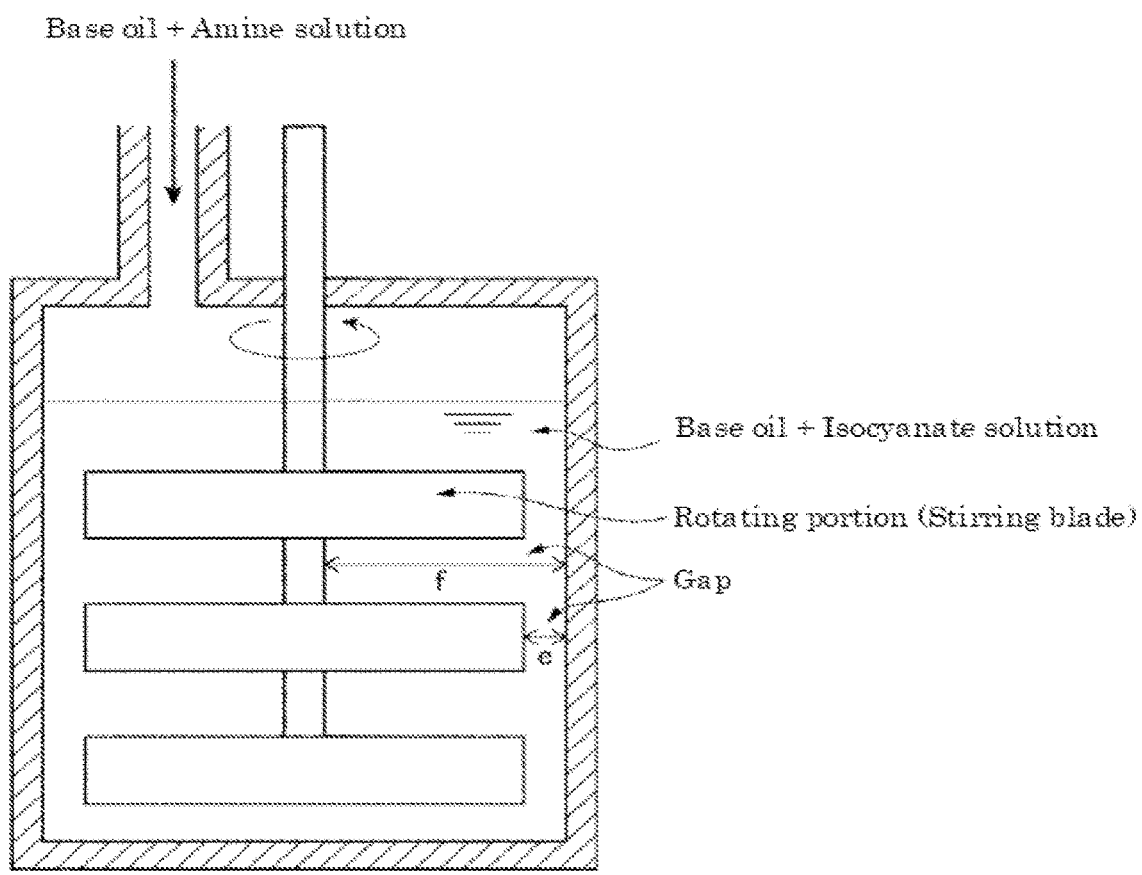
FIG. 3 is a schematic cross-sectional view of a grease production apparatus used in Comparative Example 1.

Then, using the grease production apparatus 1 shown in FIG. 3, the solution α heated to 70° C. was introduced at a flow rate of 504 L/h from a solution introducing pipe into a container body. Thereafter, the solution ß heated to 70° C. was introduced at a flow rate of 144 L/h from the solution introducing pipe into the container body having the solution α charged therein. After introducing all the solution ß into the container body, a stirring blade was rotated, and the temperature was raised to 160° C. while continuing the stirring, followed by holding for 1 hour to synthesize a urea grease (b4).

On this occasion, a maximum shear rate (Max) was 42,000 s$^{-1}$, and stirring was performed while setting a ratio of the maximum shear rate (Max) to a minimum shear rate (Min) [Max/Min] to 1.03.

A urea-based thickener (B4) contained in the urea grease (b4) corresponds to a compound represented by the general formula (b1) in which $R^1$ and $R^2$ are selected from a cyclohexyl group and an octadecyl group and $R^3$ is a diphenylmethylene group.

In addition, a molar ratio of octadecylamine and cyclohexylamine used as the raw materials (octadecylamine/cyclohexylamine) is 20/80.

(2) Preparation of Grease Composition

In the above (1), the urea grease (b4) discharged from the grease production apparatus 1 shown in FIG. 3 was stirred and then cooled by natural cooling, and were then added with the sulfur-based extreme pressure agent (C1), the phosphorus-based extreme pressure agent (C2), the extreme pressure agent (C3) containing sulfur atoms and phosphorus atoms, and the additive (D) in blending amounts shown in Table 1, to obtain a grease composition in Comparative Example 1.

[Requirement]

The urea greases synthesized in Examples 1 to 3 and Comparative Example 1 were subjected to the following calculation.

(1) Calculation of Particle Diameter of Particles Containing Urea-Based Thickener: Requirement (I)

A particle diameter of the particles containing the urea-based thickener in the grease composition was evaluated. Specifically, the urea greases as synthesized in Examples 1 to 3 and Comparative Example 1 were each used as a measurement sample and determined for the particle diameter of the particles, including the particle diameter of the particles containing the urea-based thickener (B), by the following procedures.

First, the measurement sample was defoamed in vacuum and then filled in a 1-mL syringe, 0.10 mL to 0.15 mL of the sample was extruded from the syringe, and the extruded sample was placed on a surface of a platy cell of a fixture for paste cell. Then, another platy cell was superimposed on the sample, thereby obtaining a measurement cell having the sample sandwiched by the two cells. Then, using a laser diffraction type particle diameter analyzer (trade name: LA-920 manufactured by Horiba, Ltd.), an arithmetic average particle diameter on an area basis of the particles in the sample of the measurement cell was measured.

Here, the "arithmetic average particle diameter on an area basis" means a value obtained by arithmetically averaging a particle diameter distribution on an area basis. The particle diameter distribution on an area basis is one expressing a frequency distribution of particle diameters in all particles as measurement targets on the basis of an area calculated based on the particle diameter (in detail, a cross-sectional area of particles having the particle diameter). In addition, the value obtained by arithmetically averaging the particle diameter distribution on an area basis can be calculated according to the following equation (1).

$$\text{Arithmetic average particle diameter} = \Sigma\{q(J) \times X(J)\} \div \Sigma\{q(J)\} \quad (1)$$

In the equation (1), J means a division number of particle diameter, q(J) means a frequency distribution value (unit: %), and X(J) means a representative diameter (unit: μm) in a range of a J-th particle diameter.

(2) Calculation of Specific Surface Area of Particles Containing Urea-Based Thickener: Requirement (II)

The specific surface area was calculated using the particle diameter distribution of the particles containing the thickener in the grease composition as measured in the section of Requirement (I). Specifically, using the particle diameter distribution, the total of surface areas (unit: $cm^2$) of particles per unit volume (1 $cm^3$) was calculated, and was designated as the specific surface area (unit: $cm^2/cm^3$).

[Evaluation of Low-Temperature Characteristics]

—Low-temperature Torque—

The grease compositions in Examples 1 to 3 and Comparative Example 1 were evaluated as follows.

Using the prepared grease composition, a starting torque (unit: Nm) and a rotational torque (unit: N·m) at a low temperature (−10° C.) were determined in conformity with JIS K2220:2013.

The starting torque is a torque required to output a power from a stationary state, and is preferably small. In addition, the rotational torque is a torque required to unintermittently continuously output a power, and is preferably small Evaluation results are shown in Table 1.

TABLE 1

| | Component (unit) | | | Example 1 | Example 2 | Example 3 | Comparative Example 1 |
|---|---|---|---|---|---|---|---|
| Grease composition | Base oil (A) | High-viscosity base oil (A1) | % by mass | 20.0 | 10.0 | 30.0 | 20.0 |
| | | Low-viscosity base oil (A2) | % by mass | 60.0 | 73.0 | 45.0 | 60.0 |
| | | Ultra-high viscosity synthetic oil (A3) | % by mass | 5.0 | 2.0 | 10.0 | 5.0 |
| | Urea-based thickener (B) | Urea-based thickener (B1) | % by mass | 5.0 | — | — | — |
| | | Urea-based thickener (B2) | % by mass | — | 5.0 | — | — |
| | | Urea-based thickener (B3) | % by mass | — | — | 5.0 | — |
| | | Urea-based thickener (B4) | % by mass | — | — | — | 5.0 |
| | Extreme pressure agent (C) | Sulfur-based extreme pressure agent (C1) | % by mass | 4.0 | 4.0 | 4.0 | 4.0 |
| | | Phosphorus-based extreme pressure agent (C2) | % by mass | 1.0 | 1.0 | 1.0 | 1.0 |
| | | Extreme pressure agent (C3) containing sulfur atoms and phosphorus atoms | % by mass | 2.0 | 2.0 | 2.0 | 2.0 |
| | Additive (D) | Additive (D) | % by mass | 3.0 | 3.0 | 3.0 | 3.0 |
| Total | | | % by mass | 100.0 | 100.0 | 100.0 | 100.0 |
| Base oil (A) | Total base oil (A) | | % by mass | 85.0 | 85.0 | 85.0 | 85.0 |
| | [Base oil (A1)/total base oil (A)] | | % by mass | 23.5 | 11.8 | 35.3 | 23.5 |
| | [Base oil (A2)/total base oil (A)] | | % by mass | 70.6 | 85.9 | 52.9 | 70.6 |
| | [Base oil (A3)/total base oil (A)] | | % by mass | 5.9 | 2.4 | 11.8 | 5.9 |
| | Content ratio of base oils [(A2)/(A1)] | | — | 3.0 | 7.3 | 1.5 | 3.0 |
| | Content ratio of base oils [(A2)/(A3)] | | — | 12.0 | 36.5 | 4.5 | 12.0 |
| | Content ratio of base oils [(A1)/(A3)] | | — | 4.0 | 5.0 | 3.0 | 4.0 |
| Physical property value | Base oil (A) (mixed base oil) | Kinematic viscosity at −10° C. | $mm^2/s$ | 1260 | 720 | 2300 | 1260 |
| | | Kinematic viscosity at 40° C. | $mm^2/s$ | 62 | 35 | 103 | 62 |
| | | Kinematic viscosity at 100° C. | $mm^2/s$ | 10 | 6 | 15 | 10 |
| | | Viscosity index | — | 152 | 125 | 157 | 152 |
| | Urea-based thickener (B) | Arithmetic average particle diameter of particles | μm | 0.46 | 0.31 | 0.50 | 10.00 |
| | | Specific surface area of particles | $cm^2/cm^3$ | $1.5 \times 10^5$ | $2.0 \times 10^5$ | $0.5 \times 10^5$ | $6.0 \times 10^3$ |
| | Grease composition | Worked penetration (¼) | — | 411 | 400 | 423 | 401 |
| | | Apparent viscosity (at −10° C.) | Pa·s | 27 | 20 | 31 | 30 |
| | | Dropping point | ° C. | more than 230 | more than 230 | more than 230 | more than 230 |
| | | Oil separation degree | % by mass | 6.7 | 5.2 | 9.1 | 8.4 |
| Evaluation result | Low-temperature torque (−10° C.) | Starting torque | mN·m | 16 | 14 | 19 | 21 |
| | | Rotational torque | mN·m | 5 | 4 | 6 | 7 |

The following is found from the results shown in Table 1.

In Comparative Example 1, the particle diameter of the particles containing the urea-based thickener (B) does not satisfy the requirement (I), and thus in the evaluation of the low-temperature torque at −10° C., the starting torque and the rotational torque are large, and the low-temperature characteristics cannot be ensured.

In contrast, in Examples 1 to 3 according to the embodiment of the present invention, both the starting torque and the rotational torque are sufficiently smaller than those of Comparative Example 1, and thus the low-temperature characteristics are excellent.

Next, a lubricating life was evaluated for Examples 1 and 2 and Comparative Examples 2 and 3 to be described below.

Comparative Example 2

A grease containing a lithium soap (B'1) and an organic molybdenum (C') with blending shown in Table 2 was used as a grease composition in Comparative Example 2.

Comparative Example 3

A grease containing a lithium soap (B'2) and the organic molybdenum (C') with blending shown in Table 2 was used as a grease composition in Comparative Example 3.

(Evaluation of Lubricating Life)

Figure 4:
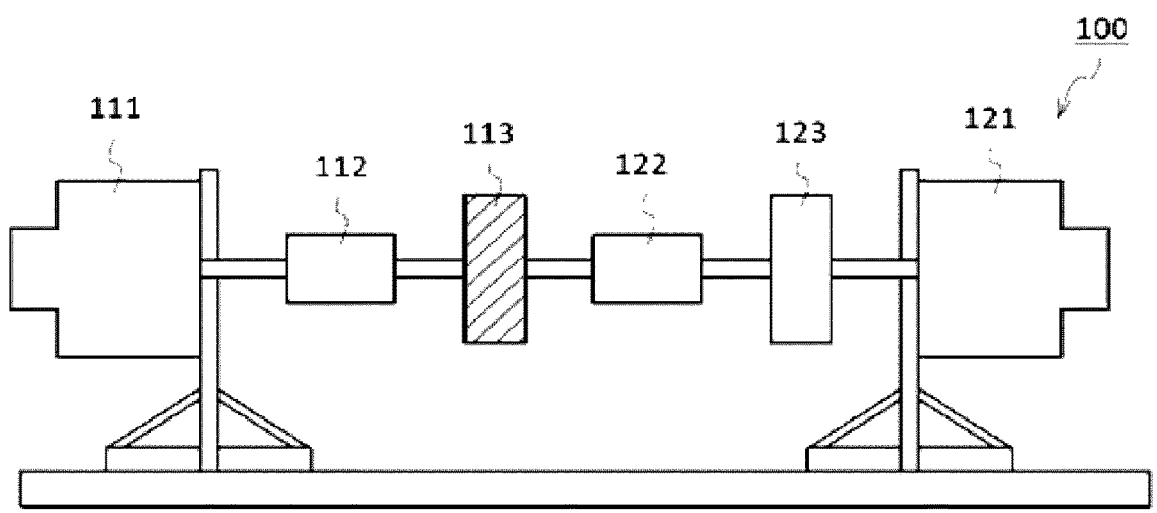
FIG. 4 is a diagrammatic view of a measurement apparatus used when measuring a lubricating life of a grease composition in Examples 1 and 2 and Comparative Examples 2 and 3.

FIG. 4 is a diagrammatic view of an apparatus used when measuring a lubricating life of the grease composition in Examples 1 and 2 and Comparative Examples 2 and 3.

A measurement apparatus 100 shown in FIG. 4 is one in which an input side motor part 111, an input side torque measuring unit 112, a test reduction gear 113 (trade name: "RV-42N" manufactured by Nabtesco Corporation), an output side torque measuring unit 122, a step-up gear 123 (trade name: "RV-125V" manufactured by Nabtesco Corporation) for absorbing a power, and a motor part 121 are connected in this order.

A grease filling case of the test reduction gear 113 of the measurement apparatus 100 shown in FIG. 4 was filled with 200 mL of the grease composition. Next, without controlling a temperature, the measurement apparatus 100 was actuated under conditions of a load torque of 1,030 N·m, an input rotation speed of the test reduction gear 113 of 2,150 rpm, and an output rotation speed of the test reduction gear 113 of 15 rpm, and an input side torque (unit: Nm) and an output side torque (unit: N·m) were measured. A speed reduction ratio of the test reduction gear 113 to the step-up gear 123 is about 140.

When an internal temperature of the grease filling case of the test reduction gear 113 reached 150° C., the measurement apparatus 100 was stopped, and a time until the internal temperature of the grease filling case of the test reduction gear 113 reached 150° C. was designated as a lubricating life of the reduction gear.

The test reduction gear 113 has a rated load torque of 412 N·m and a rated life of 280 hours. In this evaluation, a torque 2.5 times the rated torque was applied to accelerate the test, and a target life was set to 1.5 times the rated life.

(Evaluation of Wear State of Component after Lubricating Life Measurement)

Regarding the [Evaluation of Lubricating Life], when the internal temperature of the grease filling case of the test reduction gear 113 reached 150° C., the measurement apparatus 100 was stopped, and then the test reduction gear 113 was disassembled. In addition, masses of a rolling element (pin) and a roller bearing inside the test reduction gear 113 were measured.

The masses of the rolling element and the roller bearing actuated by being filled with the grease composition in Example 1 were set to 100.00, and relative masses of the rolling element and the roller bearing actuated by being filled with the grease composition in Example 2 and Comparative Examples 2 and 3 were calculated. In addition, it was visually checked how much a disassembled conical roller bearing was damaged on the entire surface of the tested component.

Evaluation results are shown in Table 2.

TABLE 2

| | | Component (unit) | | Example 1 | Example 2 | Comparative Example 2 | Comparative Example 3 |
|---|---|---|---|---|---|---|---|
| Grease composition | Base oil (A) | High-viscosity base oil (A1) | % by mass | 20.0 | 10.0 | — | — |
| | | Low-viscosity base oil (A2) | % by mass | 60.0 | 73.0 | — | — |
| | | Ultra-high viscosity synthetic oil (A3) | % by mass | 5.0 | 2.0 | — | — |
| | | Naphthenic mineral oil (A) (500N) | % by mass | — | — | 87.0 | 85.0 |
| | Thickener (B) | Urea-based thickener (B1) | % by mass | 5.0 | — | — | — |
| | | Urea-based thickener (B2) | % by mass | — | 5.0 | — | — |
| | | Lithium soap (B'1) | % by mass | — | — | 5.0 | — |
| | | Lithium soap (B'2) | % by mass | — | — | — | 5.0 |
| | Extreme pressure agent (C) | Sulfur-based extreme pressure agent (C1) | % by mass | 4.0 | 4.0 | — | — |
| | | Phosphorus-based extreme pressure agent (C2) | % by mass | 1.0 | 1.0 | — | — |
| | | Extreme pressure agent (C3) containing sulfur atoms and phosphorus atoms | % by mass | 2.0 | 2.0 | — | 1.0 |
| | | Organic molybdenum (C') | % by mass | — | — | 5.0 | 4.0 |
| | Additive (D) | Additive (D) | % by mass | 3.0 | 3.0 | 3.0 | 5.0 |
| Total | | | % by mass | 100.0 | 100.0 | 100.0 | 100.0 |
| Physical property value | Base oil (A) (mixed base oil) | Kinematic viscosity at −10° C. | mm²/s | 1260 | 720 | 3384 | 2300 |
| | | Kinematic viscosity at 40° C. | mm²/s | 62 | 35 | 82 | 60 |
| | | Kinematic viscosity at 100° C. | mm²/s | 10 | 6 | 10 | 8 |
| | | Viscosity index | — | 152 | 125 | 105 | 99 |
| | Grease composition | Worked penetration (¼) | — | 411 | 400 | 385 | 395 |
| | | Apparent viscosity (at −10° C.) | Pa·s | 27 | 20 | 85 | 70 |
| | | Dropping point | ° C. | more than 230 | more than 230 | 201 | 180 |
| | | Oil separation degree | % by mass | 6.7 | 5.2 | 11.0 | 21.0 |
| Evaluation result | Grease composition | Endurance life | h | 560 | 480 | 380 | 350 |
| | Component after reduction gear is actuated | Relative mass of rolling element (pin) | — | 100.00 | 100.00 | 99.79 | 99.62 |
| | | Relative mass of roller bearing | — | 100.00 | 100.00 | 98.38 | 98.25 |
| | | Degree of damage to conical roller bearing | — | 0/6 | 1/6 | 3/6 | 4/6 |

The following is found from results shown in Table 2.

In both Comparative Examples 2 and 3, the lubricating life of the grease composition exceeds the rated life of 280 hours.

However, Examples 1 and 2 have a lubricating life 1.5 times or more the rated life.

In addition, in Comparative Examples 2 and 3, after the reduction gear is actuated, the masses of the rolling element (pin) and the roller bearing decrease due to wear. Further, 3/6 or more of the entire conical roller bearing is damaged.

In contrast, in Examples 1 and 2, even after the reduction gear is actuated, gloss is observed on the surface of the rolling element (pin), and wear is prevented. Further, the conical roller bearing is not damaged in Example 1 and is damaged in Example 2, but the damage of the conical roller bearing is reduced to about 1/6 of the whole in Example 2.

REFERENCE SIGNS LIST 1 grease production apparatus
2 container body
3 rotor
4 introduction portion
4A, 4B solution introducing pipe
5 retention portion
6 first concave-convex portion
7 second concave-convex portion
8 discharge portion
9 first concave-convex portion on container body side
10 second concave-convex portion on container body side
11 discharge port
12 rotation axis
13 first concave-convex portion of rotor
13A concave portion
13B convex portion
14 second concave-convex portion of rotor
15 scraper
A1, A2 gap

The invention claimed is:

1. A grease composition, comprising:
a base oil (A); and
a urea-based thickener (B),
wherein particles containing the urea-based thickener (B) in the grease composition satisfy the following requirement (I):
Requirement (I): an arithmetic average particle diameter of the particles on an area basis as measured by a laser diffraction and scattering method is 2.0 μm or less,
wherein the base oil (A) is a mixed base oil containing a high-viscosity base oil (A1) having a kinematic viscosity at 40° C. of 250 mm$^2$/s to 550 mm$^2$/s, a low-viscosity base oil (A2) having a kinematic viscosity at 40° C. of 5.0 mm$^2$/s to 110 mm$^2$s, and an ultra-high viscosity hydrocarbon-based synthetic oil (A3) having a number average molecular weight (Mn) of 2,500 to 4,500 and a kinematic viscosity at 40° C. of 25,000 mm$^2$/s to 50,000 mm$^2$/s,
wherein the base oil (A) has a kinematic viscosity at 40° C. of 25 mm$^2$/s to 105 mm$^2$/s, and
wherein the base oil (A) has a viscosity index of 120 or more.

2. The composition of claim 1, wherein the particles containing the urea-based thickener (B) in the grease composition further satisfy the following requirement (II):
Requirement (II): a specific surface area of the particles as measured by the laser diffraction and scattering method is 0.5×10$^5$ cm$^2$/cm$^3$ or more.

3. The composition of claim 1, wherein, based on a total amount of the grease composition,
a content of the high-viscosity base oil (A1) is 10% by mass to 40% by mass,
a content of the low-viscosity base oil (A2) is 40% by mass to 87% by mass, and
a content of the ultra-high viscosity hydrocarbon-based synthetic oil (A3) is 2% by mass to 10% by mass.

4. The composition of claim 1, wherein a content ratio [(A2)/(A1)] of the low-viscosity base oil (A2) to the high-viscosity base oil (A1) is 1.0 to 8.7 in terms of a mass ratio.

5. The composition of claim 1, wherein a content ratio [(A2)/(A3)] of the low-viscosity base oil (A2) to the ultra-high viscosity hydrocarbon-based synthetic oil (A3) is 4.0 to 43.5 in terms of a mass ratio.

6. The composition of claim 1, wherein a content ratio [(A1)/(A3)] of the high-viscosity base oil (A1) to the ultra-high viscosity hydrocarbon-based synthetic oil (A3) is 1.0 to 20.0 in terms of a mass ratio.

7. The composition of claim 1, further comprising:
a sulfur-phosphorus-based extreme pressure agent (C).

8. The composition of claim 7, wherein the sulfur-phosphorus-based extreme pressure agent (C) contains a mixture of a sulfur-based extreme pressure agent (C1) containing sulfur atoms and a phosphorus-based extreme pressure agent (C2) containing phosphorus atoms.

9. The composition of claim 1, wherein a content of the urea-based thickener (B) is 1.0% by mass to 15.0% by mass based on the total amount of the grease composition.

10. The composition of claim 1, wherein a worked penetration at 25° C. is 355 to 430.

11. The composition of claim 1, wherein the urea-based thickener (B) is one or more selected from diurea compounds represented by the following general formula (b1):

$$R^1\text{—NHCONH—}R^3\text{—NHCONH—}R^2 \tag{b1}$$

wherein $R^1$ and $R^2$ each independently represent a monovalent hydrocarbon group having 6 to 24 carbon atoms, $R^1$ and $R^2$ may be the same as or different from each other, and $R^3$ represents a divalent aromatic hydrocarbon group having 6 to 18 carbon atoms.

12. The composition of claim 1, further comprising:
one or more additives (D) selected from an antioxidant, a lubricity improver, a rust inhibitor, a dispersant, and a metal deactivator.

13. The composition of claim 1, which is used to lubricate a lubricating site in a reduction gear or a step-up gear.

14. A lubricating method, comprising:
lubricating a lubricating site in a reduction gear or a step-up gear with the grease composition of claim 1.

* * * * *